(12) United States Patent
Sueshige

(10) Patent No.: US 10,558,403 B2
(45) Date of Patent: Feb. 11, 2020

(54) INFORMATION PROCESSING APPARATUS AND INFORMATION PROCESSING METHOD FOR PROVIDING NOTIFICATION ABOUT JOB EXECUTED BY EXECUTION APPARATUS, AND STORAGE MEDIUM

(71) Applicant: CANON KABUSHIKI KAISHA, Tokyo (JP)

(72) Inventor: Yoshiko Sueshige, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/271,663

(22) Filed: Feb. 8, 2019

(65) Prior Publication Data

US 2019/0250862 A1 Aug. 15, 2019

(30) Foreign Application Priority Data

Feb. 15, 2018 (JP) ................................ 2018-025493

(51) Int. Cl.
*G06F 3/12* (2006.01)

(52) U.S. Cl.
CPC ............ *G06F 3/1207* (2013.01); *G06F 3/126* (2013.01); *G06F 3/1259* (2013.01); *G06F 3/1286* (2013.01)

(58) Field of Classification Search
None
See application file for complete search history.

(56) References Cited

U.S. PATENT DOCUMENTS 7,802,257 B1 * 9/2010 Pariente ................ G06F 9/4843
709/223
2010/0328706 A1 * 12/2010 Miyake ................ G06F 3/1204
358/1.15

FOREIGN PATENT DOCUMENTS

JP 2007-026317 A 2/2007

* cited by examiner

*Primary Examiner* — Lennin R Rodriguezgonzalez
(74) *Attorney, Agent, or Firm* — Canon U.S.A., Inc. IP Division

(57) ABSTRACT

An apparatus includes a notification unit. The notification unit, in a case where a first job corresponding to a first notification destination and a second job corresponding to a second notification destination are issued to an execution apparatus, the first job is completed, and the second job is incomplete, notifies the first notification destination based on the notification destination information corresponding to the first job, and in a case where the first job and the second job are issued to the execution apparatus, an error occurs in the first job, and the second job is incomplete, notifies the first notification destination and the second notification destination based on notification destination information corresponding to the first job and the notification destination information corresponding to the second job.

20 Claims, 24 Drawing Sheets

FIG. 6

NOTIFICATION SETTING

INPUT USER IDENTIFICATION INFORMATION
THAT ALLOWS IDENTIFICATION OF PRINT JOB

USER NAME:

OK    Cancel

| MANAGEMENT NO. | USER NAME | CLIENT INFORMATION |
|---|---|---|
| 01 | 1111 | abc@ddd.eee |
| 02 | 2222 | xxxx-yyyy-zzzz-9999 |
| 03 | 3333 | ffgg-hhii-jjkk-8888 |

| MANAGEMENT APPARATUS | JOB ID | USER NAME | JOB STATUS | COMPLETION STATUS |
|---|---|---|---|---|
| PRINTER A | 9001 | 1111 | "NORMAL" | COMPLETED |
| PRINTER A | 9002 | 2222 | "PRINTING" | INCOMPLETE |
| PRINTER A | 9003 | 1111 | "STANDBY" | INCOMPLETE |

| MANAGEMENT APPARATUS | JOB ID | USER NAME | JOB STATUS | COMPLETION STATUS |
|---|---|---|---|---|
| PRINTER B | 9101 | 3333 | "NORMAL" | COMPLETED |
| PRINTER B | 9102 | 1111 | "SUSPENDED" | INCOMPLETE |
| PRINTER B | 9103 | 2222 | "STANDBY" | INCOMPLETE |
| PRINTER B | 9104 | 4444 | "STANDBY" | INCOMPLETE |

FIG. 11A

| MANAGEMENT APPARATUS | JOB ID | USER NAME | JOB STATUS | COMPLETION STATUS | NECESSITY OF NOTIFICATION |
|---|---|---|---|---|---|
| PRINTER A | 9001 | 1111 | "NORMAL" | COMPLETED | UNNECESSARY |

FIG. 11B

| MANAGEMENT APPARATUS | JOB ID | USER NAME | JOB STATUS | COMPLETION STATUS | NECESSITY OF NOTIFICATION |
|---|---|---|---|---|---|
| PRINTER B | 9101 | 3333 | "NORMAL" | COMPLETED | NECESSARY |
| PRINTER B | 9102 | 1111 | "SUSPENDED" | INCOMPLETE | NECESSARY |
| PRINTER B | 9103 | 2222 | "STANDBY" | INCOMPLETE | NECESSARY |
| PRINTER B | 9104 | 4444 | "STANDBY" | INCOMPLETE | NECESSARY |

FIG. 14

| MANAGEMENT APPARATUS | JOB ID | USER NAME | JOB STATUS | COMPLETION STATUS |
|---|---|---|---|---|
| PRINTER A | 9010 | 1111 | "NORMAL" | COMPLETED |
| PRINTER A | 9011 | 2222 | "SUSPENDED" | INCOMPLETE |
| PRINTER A | 9012 | 2222 | "STANDBY" | INCOMPLETE |
| PRINTER A | 9013 | 3333 | "STANDBY" | INCOMPLETE |
| PRINTER B | 9110 | 1111 | "PRINTING" | INCOMPLETE |
| PRINTER B | 9111 | 1111 | "STANDBY" | INCOMPLETE |
| PRINTER B | 9112 | 3333 | "STANDBY" | INCOMPLETE |

| MANAGEMENT APPARATUS | JOB ID | USER NAME | JOB STATUS | COMPLETION STATUS | NECESSITY OF NOTIFICATION |
|---|---|---|---|---|---|
| PRINTER A | 9010 | 1111 | "NORMAL" | COMPLETED | NECESSARY |
| PRINTER A | 9011 | 2222 | "SUSPENDED" | INCOMPLETE | NECESSARY |
| PRINTER A | 9013 | 3333 | "STANDBY" | INCOMPLETE | UNNECESSARY |

FIG. 20

| MANAGEMENT APPARATUS | INSTALLATION LOCATION | GROUP |
|---|---|---|
| PRINTER A | ○○○ | 0001 |
| PRINTER B | △△△ | 0002 |
| PRINTER C | ○○○ | 0001 |

FIG. 21

| MANAGEMENT APPARATUS | JOB ID | USER NAME | JOB STATUS | COMPLETION STATUS |
|---|---|---|---|---|
| PRINTER A | 9020 | 1111 | "NORMAL" | COMPLETED |
| PRINTER A | 9021 | 2222 | "SUSPENDED" | INCOMPLETE |
| PRINTER A | 9022 | 2222 | "STANDBY" | INCOMPLETE |
| PRINTER A | 9023 | 3333 | "STANDBY" | INCOMPLETE |
| PRINTER B | 9120 | 1111 | "PRINTING" | INCOMPLETE |
| PRINTER B | 9121 | 1111 | "STANDBY" | INCOMPLETE |
| PRINTER B | 9122 | 3333 | "STANDBY" | INCOMPLETE |
| PRINTER C | 9201 | 1111 | "PRINTING" | INCOMPLETE |

| MANAGEMENT APPARATUS | JOB ID | USER NAME | JOB STATUS | COMPLETION STATUS | NECESSITY OF NOTIFICATION |
|---|---|---|---|---|---|
| PRINTER A | 9020 | 1111 | "NORMAL" | COMPLETED | UNNECESSARY |
| PRINTER A | 9021 | 2222 | "SUSPENDED" | INCOMPLETE | NECESSARY |
| PRINTER A | 9023 | 3333 | "STANDBY" | INCOMPLETE | NECESSARY |

2200

INFORMATION PROCESSING APPARATUS AND INFORMATION PROCESSING METHOD FOR PROVIDING NOTIFICATION ABOUT JOB EXECUTED BY EXECUTION APPARATUS, AND STORAGE MEDIUM

BACKGROUND OF THE INVENTION

Field of the Invention

The aspect of the embodiments relates to an information processing apparatus and an information processing method for making a notification about a job executed by an execution apparatus, and a storage medium.

Description of the Related Art

Conventionally, a system that efficiently performs printing by connecting a plurality of personal computers (hereinafter referred to as PCs) and a printer via a network has been widely used. In many cases, a plurality of printers is connected to a network and printing is performed using an appropriate printer selected depending on the use. In such a network system, a plurality of printers is shared by a plurality of users. Thus, a printer may be installed at a certain distance from each user. Therefore, there are cases where it is difficult for a user to directly check that print processing of print data that the user has transmitted is completed at the place where the user transmitted the print data. Therefore, for example, the user goes to the place where the printer is installed to pick up the printed material based on prediction of completion time of the print processing of the print data having been transmitted by the user.

On the other hand, since the printer connected to the network is shared by a plurality of users, the print processing of the print data transmitted by another user is also performed using the same printer. Since a user cannot grasp the volume etc. of print data transmitted by another user, it is extremely difficult to predict the time when the print processing of the print data transmitted by himself/herself will be completed. Therefore, a user may be kept waiting for a long time until print processing is completed at the place where the printer is installed, or conversely printed materials may be left for a long time after the print processing is completed.

Japanese Patent Laid-Open No. 2007-026317 describes that, to a notification destination corresponding to a print job, a completion notification or error notification of the print job is sent.

As in the technique disclosed in the above-mentioned document, it is assumed here that printing is executed based on a print job by a specific printer and an error notification of the print job is made to a notification destination corresponding to the print job. In this case, for example, an error notification is not sent to other users who transmitted other print jobs to the printer.

Thus a notification about a print job may be sent to all users. In this case, however, a user is notified of print job completion of another user who is not related to the user.

SUMMARY OF THE INVENTION

An apparatus includes an acquisition unit configured to acquire status information on a status of a job executed by one of a plurality of execution apparatuses and notification destination information on a notification destination corresponding to the job, and a notification unit configured to make a notification to the notification destination corresponding to the job based on the acquired notification destination information in a case where the acquisition unit acquires completion information corresponding to completion of the job as the status information and in a case where the acquisition unit acquires error information corresponding to an error of the job as the status information, wherein the notification unit, in a case where a first job corresponding to a first notification destination and a second job corresponding to a second notification destination are issued to a predetermined execution apparatus out of the plurality of execution apparatuses, the first job is completed, and the second job is incomplete, notifies the first notification destination based on the notification destination information corresponding to the first job, and in a case where the first job and the second job are issued to the predetermined execution apparatus, an error occurs in the first job, and the second job is incomplete, notifies the first notification destination and the second notification destination based on notification destination information corresponding to the first job and the notification destination information corresponding to the second job.

Further features of the disclosure will become apparent from the following description of exemplary embodiments (with reference to the attached drawings).

BRIEF DESCRIPTION OF THE DRAWINGS

FIG. 6 is a diagram illustrating an example of a screen for receiving input of user identification information according to the embodiment.

FIGS. 9A and 9B are diagrams illustrating an example of a job queue management table according to the embodiment.

FIGS. 11A and 11B are diagrams illustrating an example of a notification destination management table according to the embodiment.

FIG. 14 is a diagram illustrating an example of a job queue management table according to a second embodiment.

FIG. 17 is a diagram illustrating an example of a notification destination management table according to the second embodiment.

FIG. 20 is a diagram illustrating an example of a printer group management table according to a third embodiment.

FIG. 21 is a diagram illustrating an example of a job queue management table according to the third embodiment.

FIG. 22 is a diagram illustrating an example of a notification destination management table according to the third embodiment.

DESCRIPTION OF THE EMBODIMENTS

Hereinafter, exemplary embodiments of the disclosure will be described in detail with reference to the accompanying drawings. It should be noted that the following embodiments do not limit the disclosure pertaining to the claims, and not all combinations of the features described in the embodiments are essential to the solving means of the disclosure.

First Embodiment

Figure 1:
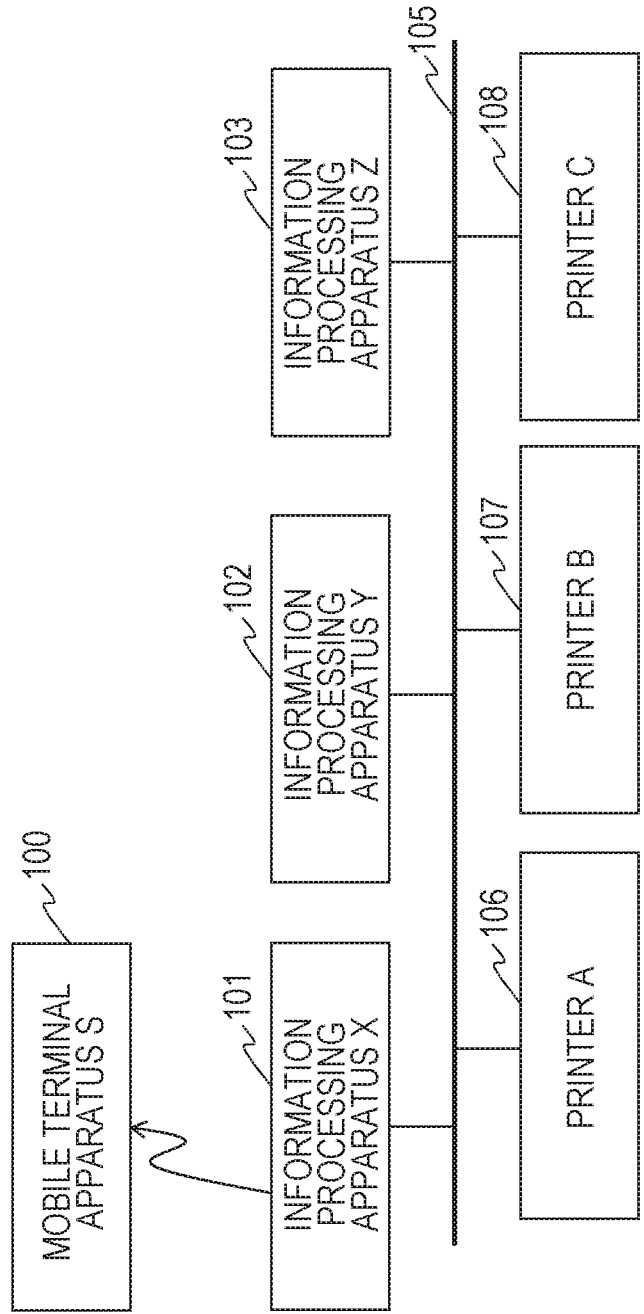
FIG. 1 is a diagram illustrating a system configuration of an embodiment.

FIG. 1 is a diagram illustrating an example of a system configuration in a network environment of a system of the present embodiment. In the present embodiment, a printer that prints an image by executing a print job will be described as an example of an execution apparatus that executes a job. Printers 106 to 108 are a plurality of ink jet printers capable of printing, but laser beam printers may be used instead. Hereinafter, unless otherwise specified, a printer A 106 will be described, but printers 107 and 108 also have similar functions unless otherwise noted. Information processing apparatuses 101 to 103 have a function of performing printing for printers 106 to 108. In at least one of the information processing apparatuses 101 to 103, a job monitoring system having a function of monitoring the status of a print job and a function of notifying a user of the status of the print job based on the user information capable of identifying the print job is realized. The information processing apparatuses 101 to 103 and the printers 106 to 108 are connected via a network 105 such as a Local Area Network (LAN) or the Intranet. A mobile terminal apparatus S 100 can receive a notification of the print job status via wireless communication by the job monitoring system included in at least one of the information processing apparatuses 101 to 103.

Figure 2:
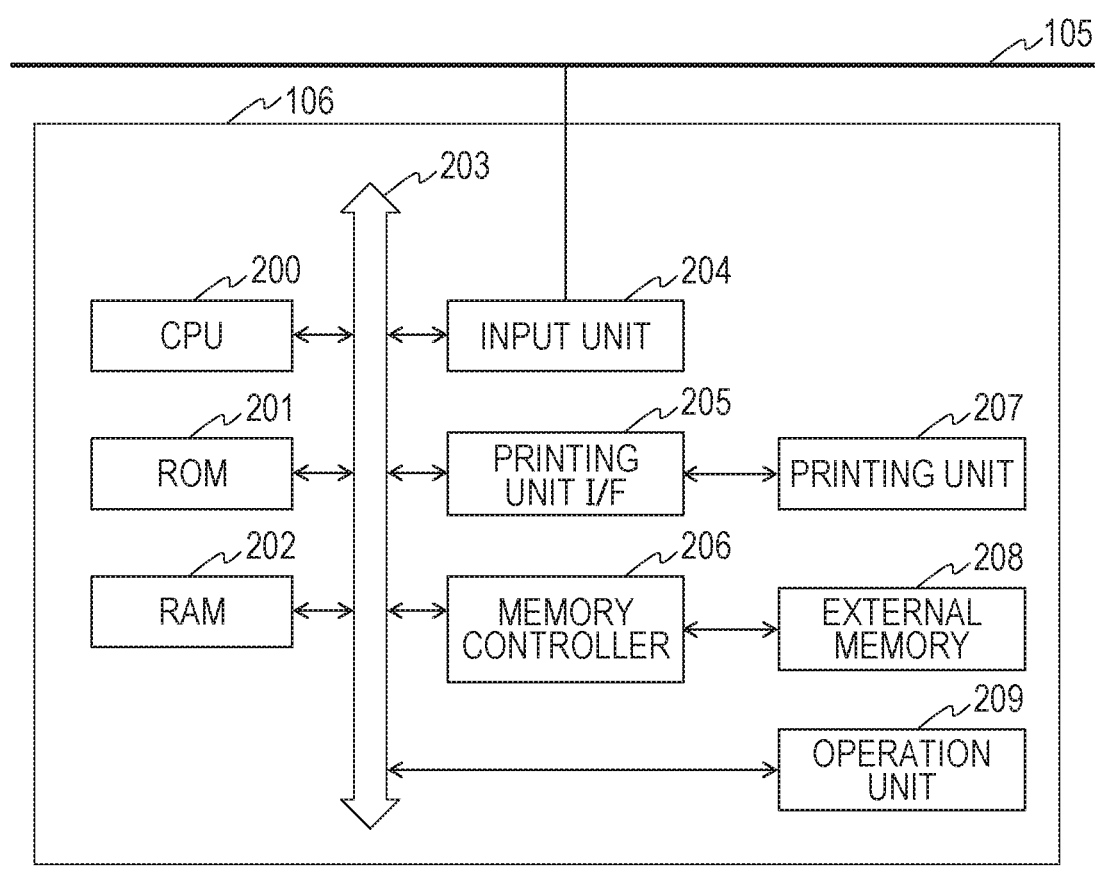
FIG. 2 is a diagram illustrating a hardware configuration of a printer according to the embodiment.

FIG. 2 is a diagram illustrating an example of a hardware configuration of the printer A 106. The printer B 107 and the printer C 108 have a similar configuration. The printer A 106 is controlled by a CPU 200. The CPU 200 operates based on a control program or the like stored in a ROM 201 that is a program ROM, a control program or the like stored in an external memory 208, or the like. The CPU 200 outputs an image signal as output information to a printing unit (printer engine) 207 connected to a printing unit I/F 205 via a system bus 203. The CPU 200 can perform communication processing with the information processing apparatuses X 101 to 103 via an input unit 204 and can notify the information processing apparatuses X 101 to 103 of the information in the printer A 106. Further, the CPU 200 can receive output data to be output to the printing unit 207 via the input unit 204. A RAM 202 is a RAM that functions as a main memory, a work area, and the like of the CPU 200, and is configured to allow extension of the memory capacity by an option RAM connected to an expansion port (not illustrated). Note that the RAM 202 may be used for an output information rendering area, an environmental data storage area, a non-volatile memory, or the like. Access to the external memory 208 such as a hard disk (HDD), an IC card is controlled by a memory controller 206. The external memory 208 can be connected as an option and store font data, an emulation program, form data, information on sheets registered in an image output apparatus, and the like. An operation unit 209 includes a panel so that various kinds of information can be displayed.

Figure 3:
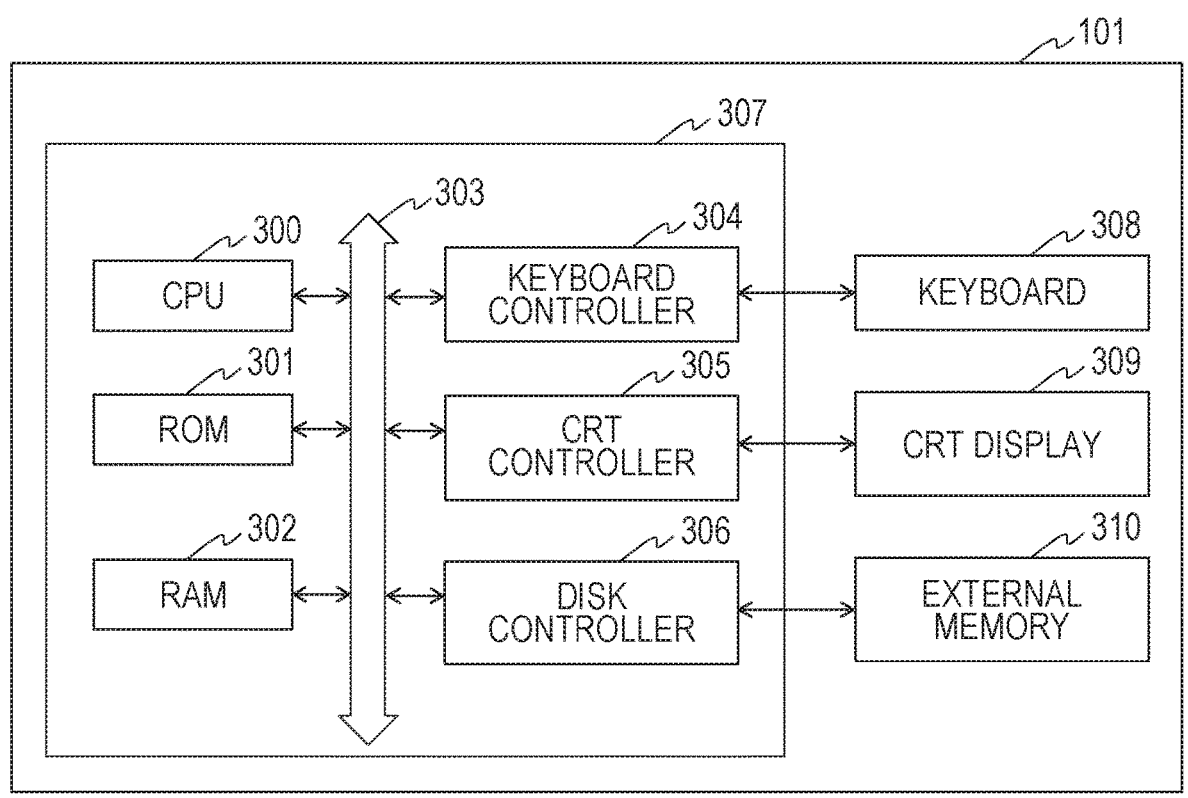
FIG. 3 is a diagram illustrating a hardware configuration of an information processing apparatus according to the embodiment.

FIG. 3 is an example of a block diagram illustrating a hardware configuration of the information processing apparatus X 101. The information processing apparatuses 102 and 103 have a similar configuration. In FIG. 3, the inside 307 of the information processing apparatus is illustrated. A CPU 300 loads various programs such as a control program, a system program, and an application program from an external memory 310 into a RAM 302 via a disk controller 306. The CPU 300 executes various kinds of programs loaded into the RAM 302 to perform various types of data processing. The CPU 300 may load a control program or the like from a ROM 301. The CPU 300 may be a dedicated circuit such as a kind of ASIC. The CPU 300 and a dedicated circuit are examples of hardware circuits and hardware processors. The disk controller 306 controls access to the external memory 310 such as an FD, an HD, a CD-ROM, a DVD-ROM, an MD, an MO and the like. The RAM 302 is configured to allow extension of the capacity by an optional RAM (not illustrated) or the like, and is mainly used as a work area of the CPU 300. A keyboard controller 304 controls key input from a keyboard 308 and a pointing device (not illustrated). A CRT controller 305 controls display on a CRT display 309. In the embodiment of the disclosure, unless otherwise specified, the CPU 300 controls, via a main bus 303, each unit connected to the main bus 303.

Figure 4:
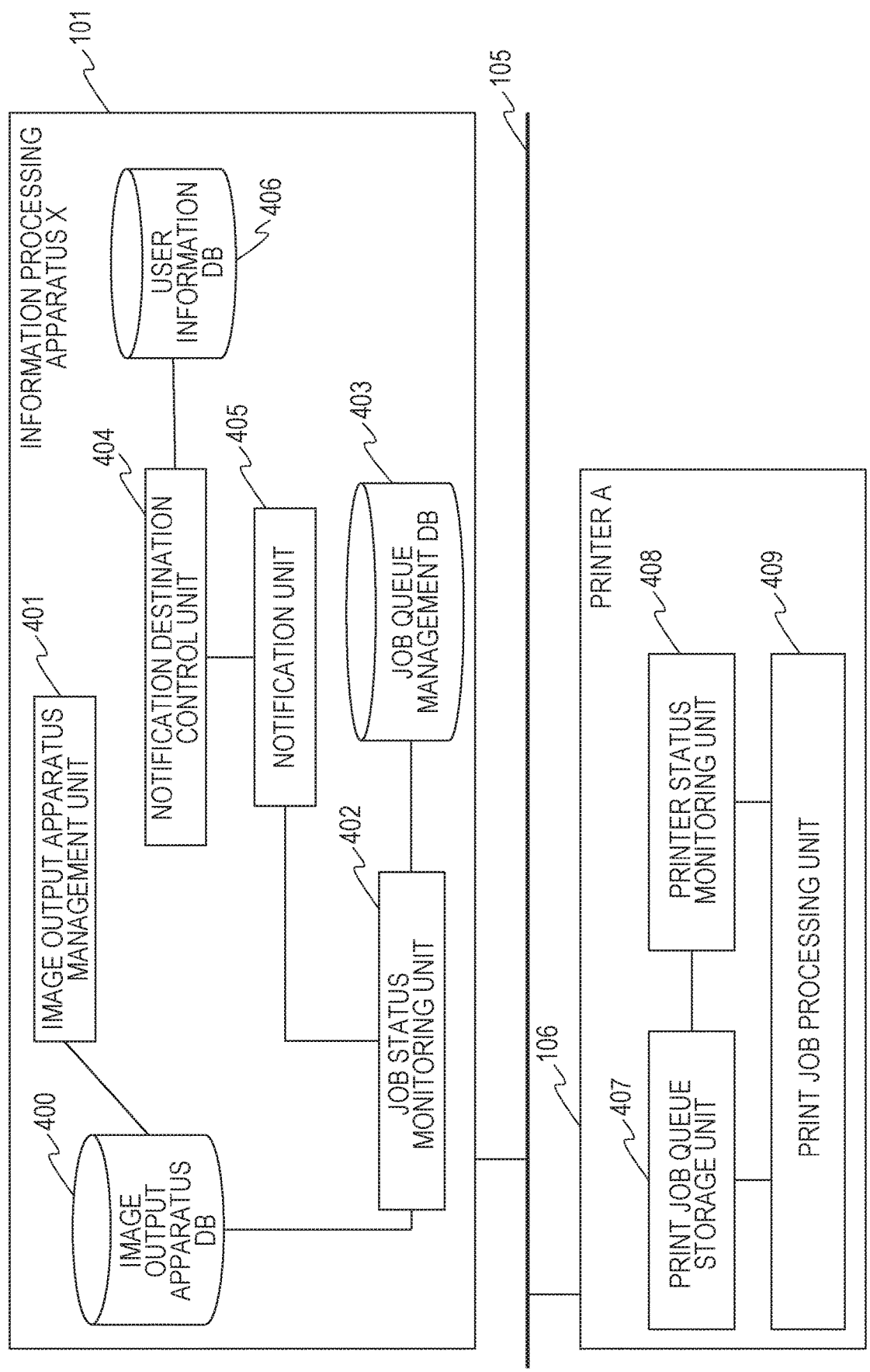
FIG. 4 is a diagram illustrating functional blocks of a job monitoring system for printers according to the embodiment.

FIG. 4 is a diagram illustrating an example of functional blocks of the present system. First, functional blocks related to printing in the printer A 106 will be described. A print job queue storage unit 407 receives a print request from any one of the information processing apparatuses X 101 to 103. A print job processing unit 409 sequentially receives print jobs from the print job queue storage unit 407 and executes printing. A printer status monitoring unit 408 monitors the execution status of a print job of the print job processing unit 409 and notifies the printer A 106 or other terminals of predetermined information. Next, functional blocks of the information processing apparatus X 101 of FIG. 4 will be described. An image output apparatus DB 400 stores information for integrally controlling the group of printers (106 to 108) that are management targets by the information processing apparatus X 101. An image output apparatus management unit 401 has a function of searching for the group of printers (106 to 108) over the network and acquiring information for the image output apparatus DB 400 from each of the found printers (106 to 108). The information acquired by the image output apparatus management unit 401 is stored in the image output apparatus DB 400. The image output apparatus management unit 401 acquires, for example, printer names and access information for accessing printers (IP address etc.) of the printers (106 to 108) in the group, and stores the acquired information in the image output apparatus DB 400. For example, the image output apparatus management unit 401 stores the printer name of the printer and the access information for accessing the printer in association with each other in the image output apparatus DB 400.

A job status monitoring unit 402 acquires the print job queue information for each of the printers (106 to 108) in the group stored in the print job queue storage unit 407 at predetermined time intervals. For example, job status monitoring unit 402 requests job queue information for each of the printers (106 to 108) of the group managed by the image output apparatus DB 400 by using the access information stored in the image output apparatus DB 400. The job queue information acquired by the job status monitoring unit 402 is recorded in a job queue management DB 403. A notification destination control unit 404 receives registration information from a user and stores the received user registration information in a user information DB 406. The user registration information includes a user name, and client information (IP address, mail address, etc.) on a notification destination when a notification to a user terminal used by the user is performed. Upon being triggered by the job status monitoring unit 402 and the notification destination control unit 404, a notification unit 405 identifies a notification destination based on the job queue information stored in the job queue management DB 403 and the user registration information stored in the user information DB and notifies the notification destination of predetermined information.

In the present embodiment, a print completion notification is provided to a user who issued jobs to a specific printer all of which are completed out of users stored in the user information DB. In addition, when an error occurs in a specific printer, an error notification is provided to all users who issued incomplete jobs included in the job queue information of the specific printer. That is, as for the print completion notification, the notification destination is limited to a user who issued jobs to a specific printer all of which are completed. On the other hand, as for the error notification, all users who issued an incomplete job to a specific printer are notified. Therefore, it is possible to prompt a user to take printed materials after all jobs issued to the specific printer by the user are completed. In addition, it is possible for another user who issued an incomplete print job to the same printer to recognize that an error has occurred to the print job issued by a different user. Note that the print completion notification and the error notification are different notifications. For example, when a message (text) is displayed on the user terminal as a way of notification, the print completion notification and the error notification have different the contents of messages.

The functions of the function blocks including the image output apparatus management unit 401, the job status monitoring unit 402, the notification destination control unit 404, and the notification unit 405 are realized by the CPU 300. Specifically, a program module corresponding to each functional block is stored in the ROM 301, and the CPU 300 executes each program module to operate as the corresponding functional block. Similarly, a program module corresponding to a function of each of the functional blocks including the printer status monitoring unit 408 and the print job processing unit 409 is stored in the ROM 301. Then, the CPU 200 executes each program module to operate as the corresponding functional block. In the following description, processing by the CPU 200 and the CPU 300 will be described as processing by each functional block illustrated in FIG. 4.

Figure 5:
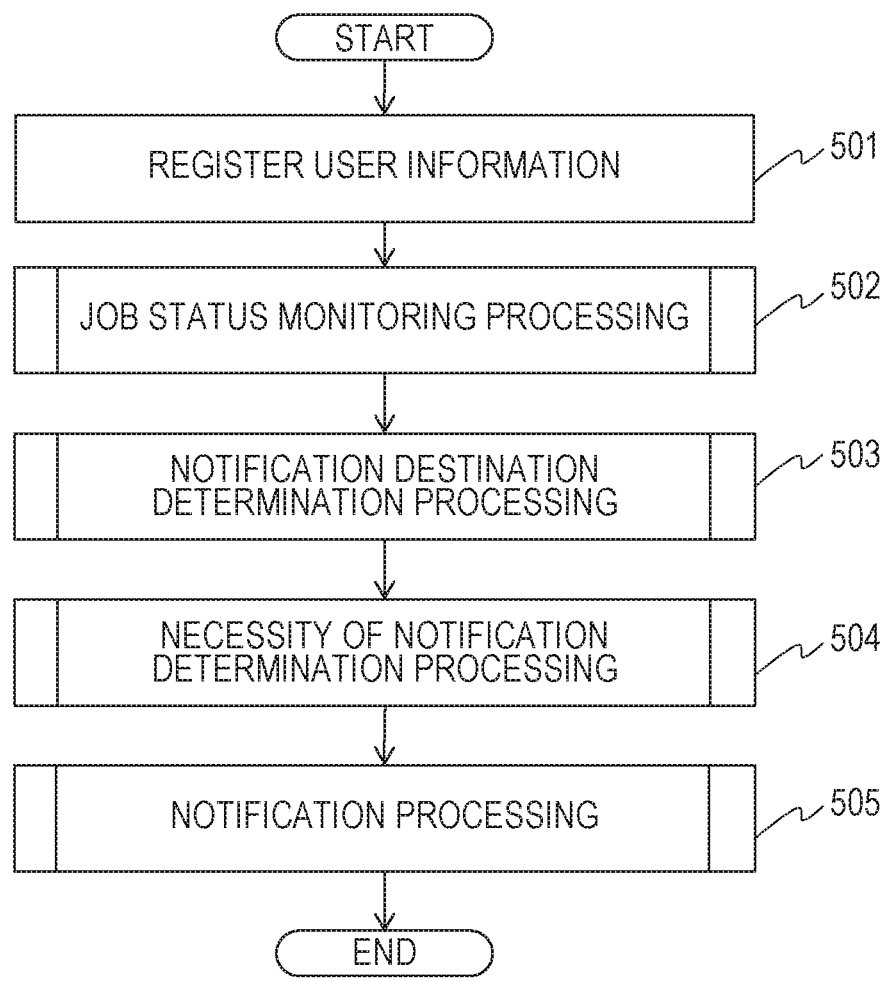
FIG. 5 is a flowchart illustrating the overall flow of a job monitoring system according to the embodiment.

FIG. 5 is a flowchart illustrating the overall flow of processing of the present system. Note that a status management program for performing each processing step illustrated in FIG. 5 is stored in the ROM 301, and each processing step illustrated in FIG. 5 is realized by the CPU 300 executing the program. First, the notification destination control unit 404 registers user information for the present system in step 501. More specifically, user identification information that allows identification of a print job and terminal information of a terminal where the user wants to receive notification are registered. Next, in step 502, the job status monitoring unit 402 acquires the print job queue information for the group of printers (106 to 108) managed by the image output apparatus DB 400, and monitors the job status. In step 503, the notification unit 405 performs notification destination determination processing based on the job status monitored in step 502. In step 504, the notification unit 405 determines necessity of notification for the notification destination determined in step 503 based on the job status, and notifies the notification destination determined to notify of the job status in step 505.

It should be noted that registration of user information in step 501 in FIG. 5 is not required to be performed every time when the status management program is started. The registration may be performed, for example, in response to instruction by a user when the user newly registers user information. Alternatively, processing steps 502 to 505 may be performed in response to an instruction from a user after the status management program is started or may be automatically performed periodically.

FIG. 6 is a diagram illustrating an example of a screen for receiving input of user identification information in step 501 for registration of user information. Assuming that the user identification information is information included in the print job information, the user identification information may correspond to a PC login user name when a print request is from an information processing apparatus such as a PC. The user name input here is stored in the user information DB 406.

Figure 7:
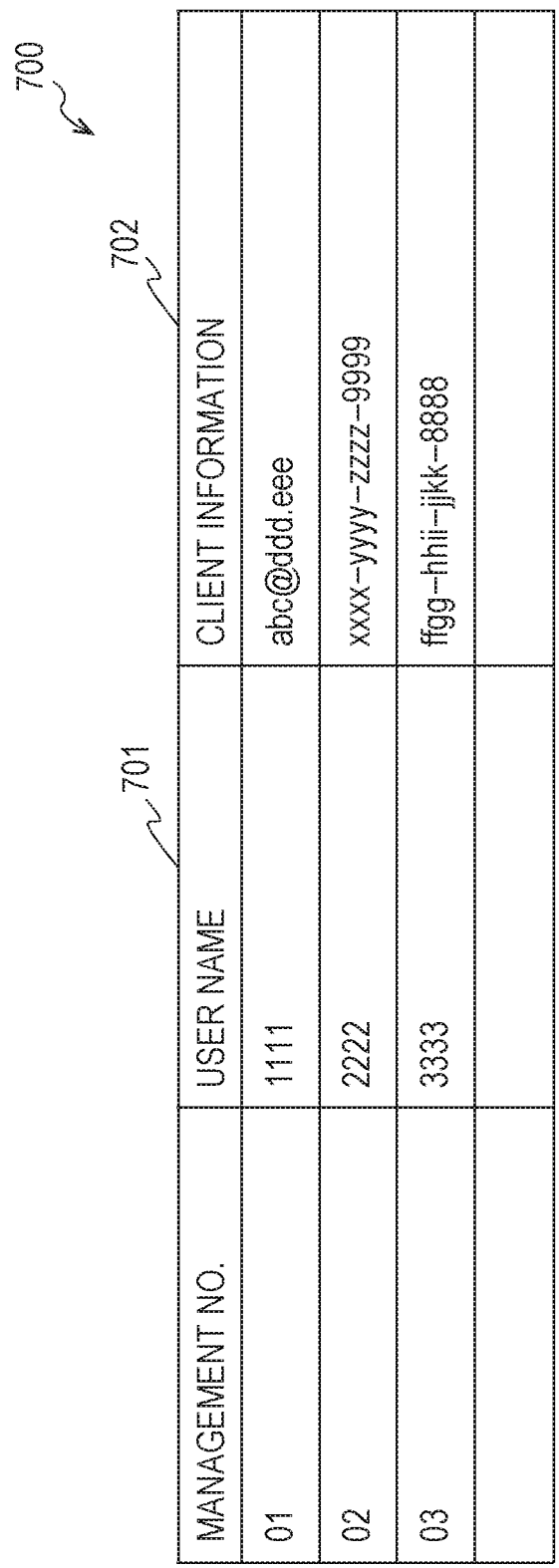
FIG. 7 is a diagram illustrating an example of a user information management table according to the embodiment.

FIG. 7 is a diagram illustrating an example of a user information management table stored in the user information DB 406. The input user identification information is registered in the table as a user name 701. Corresponding client information 702 corresponds to notification destination information indicating a notification destination to be notified of the status of the print job identified by the user name. This information is referred to in notification processing in step 505 to be described below and used as information for identifying the destination as the notification destination according to the notifying means. The client information is, for example, a private IP address when a notification is provided via a LAN, and a mail address or the like when a notification is provided by an e-mail. Registration of client information is not illustrated here, but exemplary configurations include a configuration for receiving input from a user similarly to the case of user identification information, and a configuration for acquiring the client information via a network or wireless communication.

Figure 8:
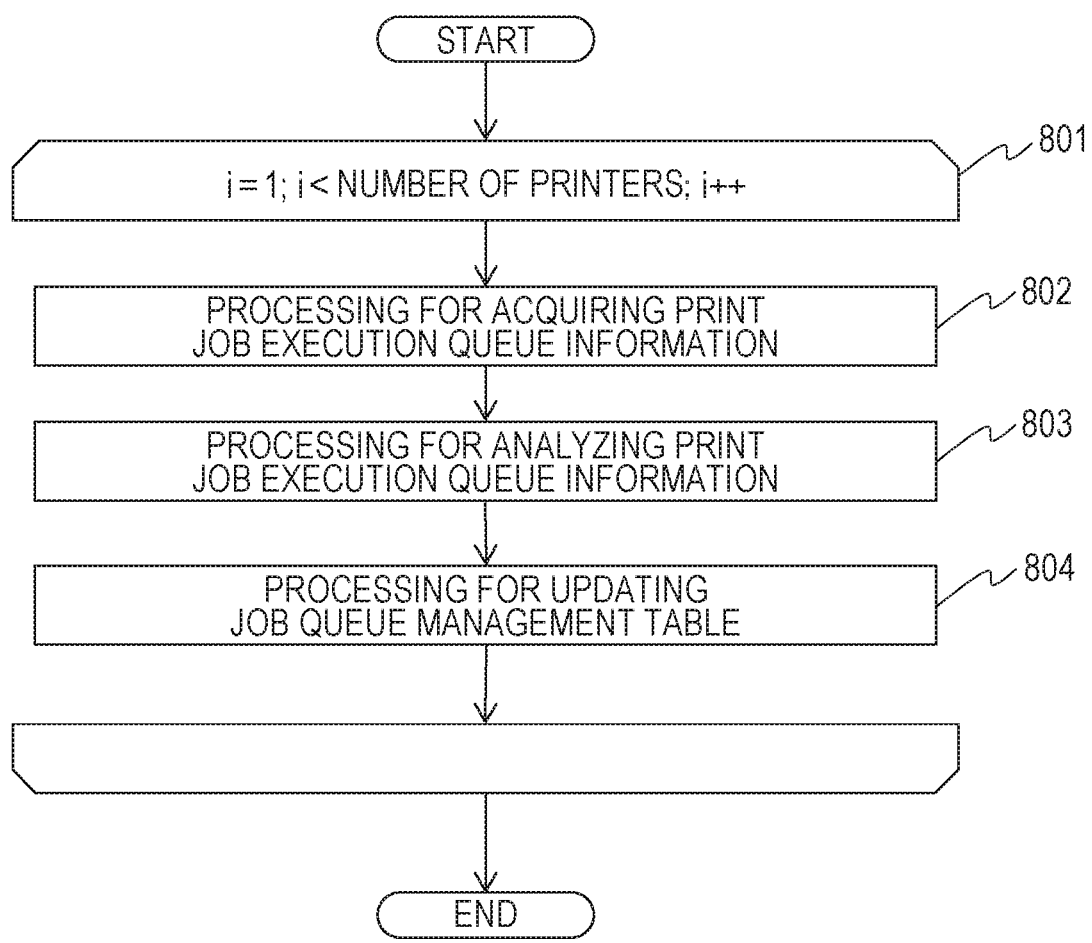
FIG. 8 is a flowchart illustrating details of job status monitoring processing according to the embodiment.

FIG. 8 is a flowchart illustrating details of job status monitoring processing in step 502. First, in step 801, the job status monitoring unit 402 repeats processing for the number of printers in the group of printers (106 to 108) managed by the image output apparatus DB. In step 802, the job status monitoring unit 402 acquires the print job execution queue information from the print job queue storage unit 407 of the printer according to access information stored in the image output apparatus DB. Next in step 803, the job status monitoring unit 402 analyzes each print job stored in the print job execution queue information acquired in step 802. Then, in step 804, the job status monitoring unit 402 stores predetermined information illustrated in FIGS. 9A and 9B for each print job in a job queue management table stored in the job queue management DB 403.

FIGS. 9A and 9B are diagrams illustrating examples of a job queue management table. Information on each row of the job queue management table corresponds to job information to be described below. In the columns of a management apparatus 901, printer names of printers from which the print job execution queue information is acquired are listed. Printer names, "PRINTER A", "PRINTER B", and "PRINTER C" used in the following description are printer names of the printer A 106, the printer B 107, and the printer C 108, respectively. In the column of a job ID 902, job identifiers that are uniquely managed among the printers are listed. In the column of a user name 903, owners of the jobs are listed. This information is set to a print job as a part of job information and provided by an information processing apparatus that executes printing when the printing is executed. In the column of a job status 904, execution statuses of the print jobs are listed. This information allows determination of a status of printing as well as an end status that is normal end or abnormal end when the printing ends, a standby status when another printing job is executed, and the like. The information of the job status 904 corresponds to job status information to be described below. In the present embodiment, "SUSPENDED" in the job status 904 corresponds to error information. The column of a completion status 905 indicates whether the job is completed separately from the job status 904. In the present embodiment, "COMPLETED" included in the completion status 905 corresponds to completion information, and "INCOMPLETE" included in the completion status 905 corresponds to incompletion information.

A job queue management table 900 illustrated in FIG. 9A represents an example of a status in which job information based on the print job execution queue information acquired from the printer A 106 is stored. More specifically, the print jobs identified by job IDs 9001 to 9003 are stored in the print job execution queue of the printer A. It is indicated that the job ID 9001 identifies a print job that is executed by a user having a user name "1111" and normally completed. It is indicated that the job ID 9002 identifies a print job that is executed by a user having a user name "2222", and printing is currently executed and incomplete. It is indicated that the job ID 9003 identifies a print job executed by the user having the user name "1111", that is, the print job is executed by the same user as the print job identified by the job ID 9001. Since the print job having the job ID 9002 is currently executed, it is indicated that the print job identified by the job ID 9003 is in a status of print standby and incomplete.

A job queue management table 910 illustrated in FIG. 9B represents an example of a status in which job information based on the print job execution queue information acquired from the printer B 107 is stored. More specifically, the print jobs identified by job IDs 9101 to 9104 are stored in the print job execution queue of the printer B. It is indicated that the job ID 9101 identifies a print job that is executed by a user having a user name "3333" and normally completed. It is indicated that the job ID 9102 identifies a print job executed by the user having the user name "1111", and printing is suspended for some reason and incomplete. It is indicated that the job IDs 9103 to 9104 identify print jobs executed by users having user names "2222" and "4444", and since the job identified by the job ID 9102 is stopped and suspended, printing is in the status of print standby and incomplete.

Figure 10:
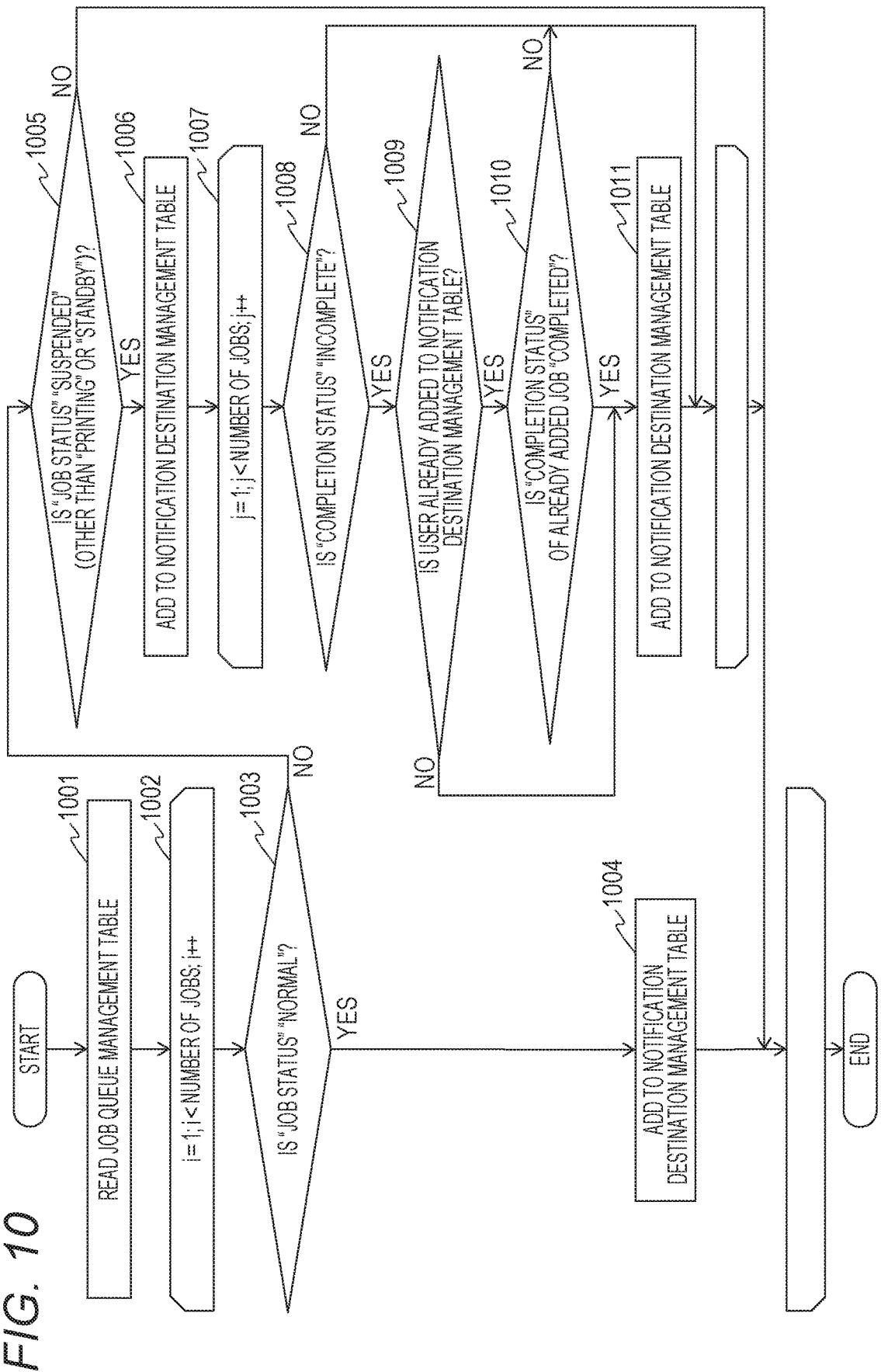
FIG. 10 is a flowchart illustrating details of notification destination determination processing according to the embodiment.

FIG. 10 is a flowchart illustrating details of step 503 of notification destination determination processing. The processing illustrated in FIG. 10 starts in response to the end of the job status monitoring processing (step 502) illustrated in FIG. 8. First, in step 1001, the notification unit 405 reads the job queue management table 900 or 910, and performs notification destination determination processing corresponding to a job status for the number of records stored in the table, that is, the number of jobs (step 1002). In step 1003, the notification unit 405 extracts the job status 904 and determines whether the job status is "NORMAL". If the job status is "NORMAL" ("YES" in step 1003), the processing proceeds to step 1004, and the notification unit 405 adds the job information as a notification target to the notification destination management table. Details of the notification destination management table at this time will be described below. On the other hand, if the job status is other than "NORMAL" ("NO" in step 1003), the processing proceeds to step 1005, and the notification unit 405 determines whether the job status is "SUSPENDED". If the job status is not "SUSPENDED", that is, the job status is "PRINTING" or "STANDBY" ("NO" in step 1005), the notification unit 405 determines that the job is not a notification target of the job status and moves on to analysis of next job information. On the other hand, if the job status is other than "SUSPENDED", that is, the job status is "PRINTING" or "STANDBY" ("YES" in step 1005), the processing proceeds to step 1006. The case where the job status is "SUSPENDED" is a case where, for example, an error has occurred in the printer. The notification unit 405 adds the concerned job information to the notification destination management table as a notification target. Next, the processing proceeds to step 1007, and the notification unit 405 searches for incomplete jobs other than the jobs for the number of jobs in the job queue management table. This is performed in order to extract job status information of the incomplete jobs that are following and in a standby status and to add the jobs to the notification destination management table as notification targets to be notified that the job status thereof is "SUSPENDED". First, in step 1008, the notification unit 405 extracts the job completion status 905 and determines whether the completion status is "INCOMPLETE". If the completion status of the job is not "INCOMPLETE" ("NO" in step 1008), the processing proceeds directly to search for a next incomplete job. If the completion status is "INCOMPLETE" ("YES" in step 1008), the notification unit 405 refers to the user name of the job information and determines whether the user name is of a user who is already added to the notification destination management table (step 1009). If the user name of the job information is not of a user who is already added to the notification destination management table ("NO" in step 1009), it is determined that the user who issued the job is a user to be newly added, and the processing proceeds to step 1011. In step 1011, the notification unit 405 adds the job status information as a notification target to the notification destination management table. On the other hand, if it is determined that the user name of the job information is of a user already registered in the notification destination management table ("YES" in step 1009), the notification unit 405 determines whether the completion status of the job information of the already added user is "COMPLETED" (step 1010). If the completion status of the job information of the already added user is "COMPLETED" ("YES" in step 1010), the processing proceeds to step 1011 and the job status information is added as a notification target to the notification destination management table. On the other hand, if the completion status of the job information of the already added user is not "COMPLETED" ("NO" in 1010), the notification unit 405 does not add the status information of the job to the notification destination management table, and the processing proceeds to searching for a next incomplete job.

According to the processing illustrated in FIG. 10, when the print job is normally completed, the status information of the job is added to the notification destination management table (step 1004). If the job status of a certain job is "SUSPENDED" because of an error or the like ("YES" in step 1005), whether to add incomplete jobs following the i-th job in the job queue management table to the notification destination management table is determined (steps 1009 and 1010). Then, job information is added to the notification destination management table so that a user who issued a job that was not a notification target is to be notified of the job status "SUSPENDED" ("NO" in step 1009 and step 1011). Alternatively, job information is added to the notification destination management table so that a user corresponding to notification targets having a job status "COMPLETED" only is notified of "SUSPENDED" ("YES" in step 1009, "YES" in step 1010, and step 1011).

Note that the notification destination management table is prepared for each of the plurality of job queue management tables (900 and 910) illustrated in FIGS. 9A and 9B, and the processing illustrated in FIG. 10 is executed for each of the plurality of job queue management tables. That is, a notification destination management table is created for each of the plurality of printers, which are management apparatuses.

The processing in steps 1002 and 1007 is repeated for each of the plurality of job queue management tables (900 and 910). Therefore, in the processing in step 1009, for a job queue management table including j-th job as a determination target, it is determined whether a job that is already added to the notification destination management table and that has a user name that is the same as that of the j-th job exists.

FIGS. 11A and 11B are diagrams illustrating examples of the notification destination management table. The difference from the job queue management table is only the item of necessity of notification 1101. At the stage when the processing illustrated in FIG. 10 is completed, the value of necessity of notification 1101 is set to "NECESSARY" as an initial value, for example, and by the determination processing for determining necessity of notification illustrated in FIG. 12, the value of necessity of notification 1101 is updated. FIGS. 11A and 11B illustrate notification destination management tables after the processing for determining necessity of notification illustrated in FIG. 12 is performed.

FIG. 11A illustrates the notification destination management table generated based on the notification destination determination processing for the job queue management table 900. Since the job status of the job identified by the job ID 9001 is determined to be "NORMAL" in step 1003, the job is added to a notification destination management table 1100 in step 1004. Since the job status of the job identified by the following job ID 9002 is "PRINTING" and other than "NORMAL", it is determined as "NO" in step 1003 and since the status is other than "SUSPENDED", it is determined as "NO" in step 1005. Therefore, the job status is not added to the notification destination management table 1100. The job status of the job identified by the job ID 9003 is "STANDBY". Thus, similarly to the job identified by the job ID 9002, it is determined as "NO" in step 1003 since the status is other than "NORMAL", and it is determined as "NO" in step 1005 since the status is not "SUSPENDED". Therefore, the job status is not added to the notification destination management table 1100 for the job ID 9003, and the notification destination determination processing ends.

FIG. 11B illustrates the notification destination management table generated based on the notification destination determination processing for the job queue management table 910. Since the job status of the job identified by the job ID 9101 is determined to be "NORMAL" in step 1003, the processing proceeds to step 1004, and the job information is added to a notification destination management table 1110. For the job identified by the next job ID 9102, it is determined as "NO" in step 1003 since the job status is other than "NORMAL" and it is determined as "YES" in step 1005 since the job status is "SUSPENDED". In step 1006, the job information is added to the notification destination management table 1110 as a notification target. Next, in step 1007, incomplete job searching is performed for the number of jobs in the job queue management table. For the job identified by the job ID 9101 having "COMPLETED" as a completion status, it is determined as "NO" in step 1008, and the processing target is shifted to the next job identified by the job ID 9102. Since it is determined in step 1008 that the completion status of the job identified by the job ID 9102 is "INCOMPLETE", the processing proceeds to step 1009. Regarding the job ID 9102, the job information is added to the notification destination management table in step 1006. Therefore, in the processing in step 1009 for the job ID 9102, it is determined that the user name of the job is the user name ("1111") of the user who is already added to the notification destination management table ("YES" in step 1009). Therefore, the processing proceeds to step 1010. However, since the completion status of the job information of the job identified by the job ID 9102 issued by the already added user "1111" is "SUSPENDED" and not "COMPLETED" ("NO" in step 1010), the processing proceeds to the next job identified by the job ID 9103. Regarding the following jobs identified by the job IDs 9103 and 9104, since the completion status is "INCOMPLETE" ("YES" in step 1008) and the user name is not added yet to the notification destination management table ("NO" in step 1009), the processing proceeds to step 1011. Then, the job information corresponding to job IDs 9103 and 9104 is added to the notification destination management table 1110 as notification targets. Thereafter, the processing returns to step 1002, and the processing is repeated with the job identified by the job ID 9103 as a processing target. For the jobs identified by the job IDs 9103 and 9104, it is determined as "NO" in step 1003 since the job status is "STANDBY" and it is determined as "NO" in step 1005 since the job status is other than "SUSPENDED". Therefore, the processing illustrated in FIG. 10 ends.

Figure 12:
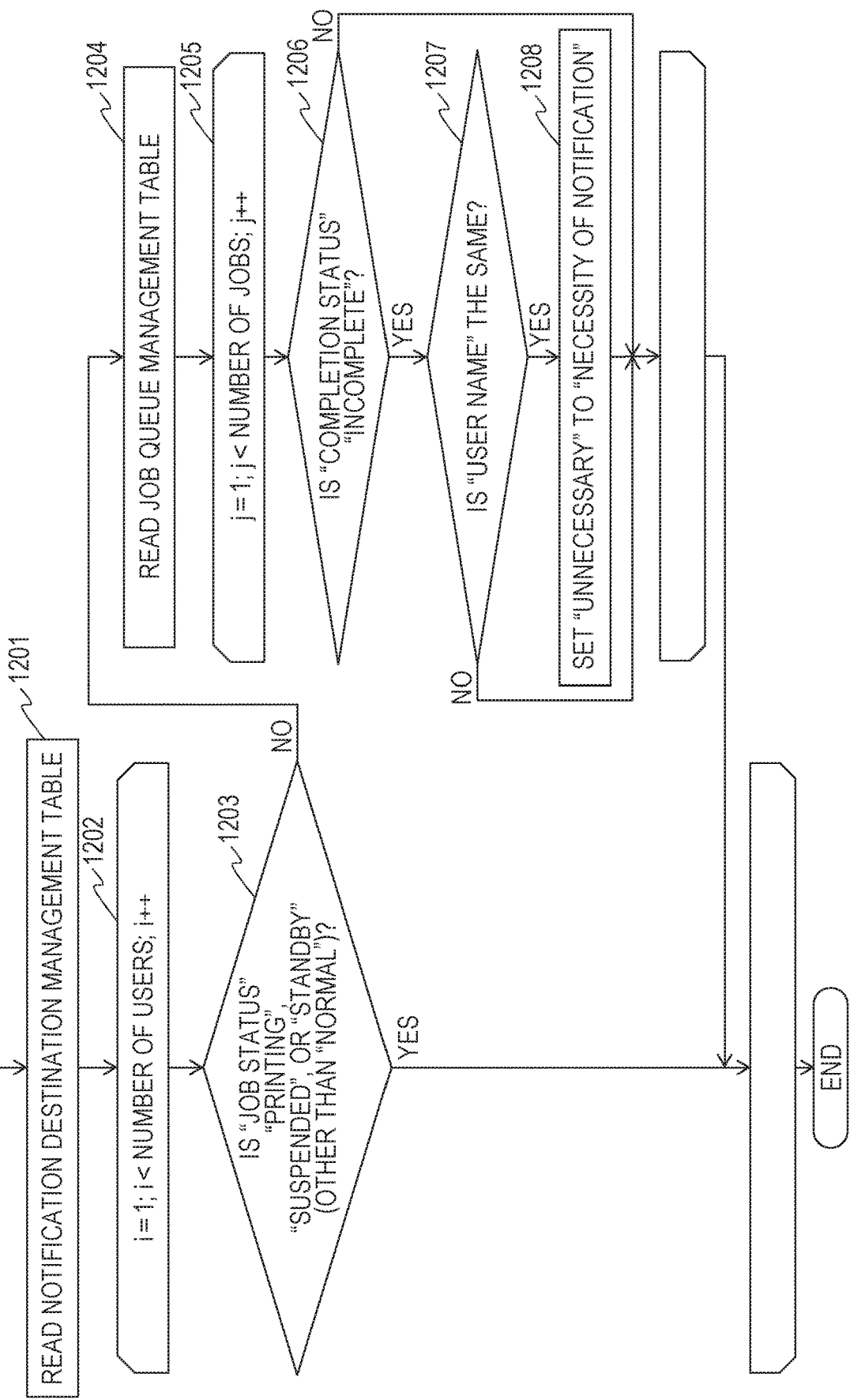
FIG. 12 is a flowchart illustrating details of necessity of notification determination processing according to the embodiment.

FIG. 12 is a flowchart illustrating details of the necessity of notification determination processing in step 504. The processing illustrated in FIG. 12 starts in response to the end of the notification destination determination processing (step 503) illustrated in FIG. 10. First, in step 1201, the notification unit 405 reads the notification destination management table as illustrated in FIGS. 11A and 11B, and performs necessity of notification determination processing corresponding to a job status for the number of records stored in the table, that is, the number of users determined to be notification targets (step 1202). At this time, it is assumed that "NECESSARY" is set as the initial value in the item of necessity of notification 1101. In step 1203, the notification unit 405 extracts the job status and determines whether the job status is other than "NORMAL", that is, "PRINTING", "SUSPENDED", or "STANDBY". If the job status is one of "PRINTING", "SUSPENDED", and "STANDBY" ("YES" in step 1203), the processing returns to step 1202 with the item of necessity of notification 1101 of the user in the notification destination management table kept "NECESSARY". If the job status is "NORMAL" ("NO" in step 1203), the processing proceeds to step 1204. In steps 1204 to 1207, the notification unit 405 checks whether a job that was issued by the same user and that is incomplete exists in the job queue management table. First in step 1204, the notification unit 405 reads the job queue management tables illustrated in FIGS. 9A and 9B and performs processing for the number of records stored in the tables, that is, the number of jobs (step 1205). If the job status is "INCOMPLETE" ("YES" in step 1206), the processing proceeds to step 1207. In step 1207, the notification unit 405 determines whether the user name read from the job queue management table in step 1205 is the same as the user name read from the notification destination management table in step 1202. If it is determined that the user name of the incomplete job is the same as the user name read from the notification destination management table ("YES" in step 1207), the processing proceeds to step 1208 because the notification is unnecessary. Then, in step 1208, the notification unit 405 overwrites the item of necessity of notification 1101 for the user in the notification destination management table with "UNNECESSARY".

On the other hand, if the job status is other than "INCOMPLETE" ("NO" in step 1206) or if the user name of the incomplete job is not the same as the user name read from the notification destination management table ("NO" in step 1207), the processing returns to step 1205.

More specifically, the processing is described with the notification destination management table 1100 as an example. In step 1201, the notification unit 405 reads the notification destination management table 1100. The number of records stored in the table is only one corresponding to job information that is identified by the job ID 9001 and has the user name "1111". Since in step 1203, it is determined that the job status is "NORMAL" ("NO" in step 1203), the processing proceeds to step 1204. The notification unit 405 reads the job queue management table 900, and repeats the processing for the number of records stored in the table, that is, the number of jobs in step 1205. Since the completion status of the job identified by the job ID 9001 is "COMPLETED" ("NO" in step 1206), the processing returns to step 1205, and the processing target is shifted to the next job. Since it is determined that the completion status of the job identified by the job ID 9002 is "INCOMPLETE" ("YES" in step 1206), the processing proceeds to step 1207. The job identified by the job ID 9002 has the user name "2222", and the user name is not the same as the user name "1111" of the job identified by the job ID 9001 read from the notification destination management table 1100 ("NO" in step 1207). Therefore, the processing returns to step 1205, and the processing target shifts to the next job. Since the completion status of the job identified by the job ID 9003 is "INCOMPLETE" ("YES" in step 1206), the processing proceeds to step 1207. The job identified by the job ID 9003 has the user name "1111", and the user name is the same as the user name "1111" of the job identified by the job ID 9001 read from the notification destination management table 1100 ("YES" in step 1207). Thus, it is determined that notification of the job identified by the job ID 9001 is unnecessary. Then, in step 1208, the notification unit 405 overwrites the item of necessity of notification 1101 for the user in the notification destination management table 1100 with "UNNECESSARY", and the processing ends.

By the processing illustrated in FIG. 12, the values of necessity of notification 1101 are set as illustrated in FIGS. 11A and 11B. According to the processing illustrated in FIG. 12, if a user who has issued a print job for which printing is completed has also issued a print job that is in a standby or printing status, notification of print completion to the user can be prevented. That is, it is possible to prevent notification of print completion to the user at a timing when printing of some of the print jobs having been issued by the user is completed even though printing of all of the print jobs are not completed. Therefore, it is possible to prevent a situation where a user who received notification of print completion and went to the printer to get printing sheets is kept waiting at the printer for completion of the following print jobs.

Then, for example, in the case where no incomplete job having the user name "1111" has been issued to the printer A after completion of the job identified by the job ID 9003 illustrated in FIG. 9A, the user is notified of print completion when the processing illustrated in FIG. 5 is performed again.

Figure 13:
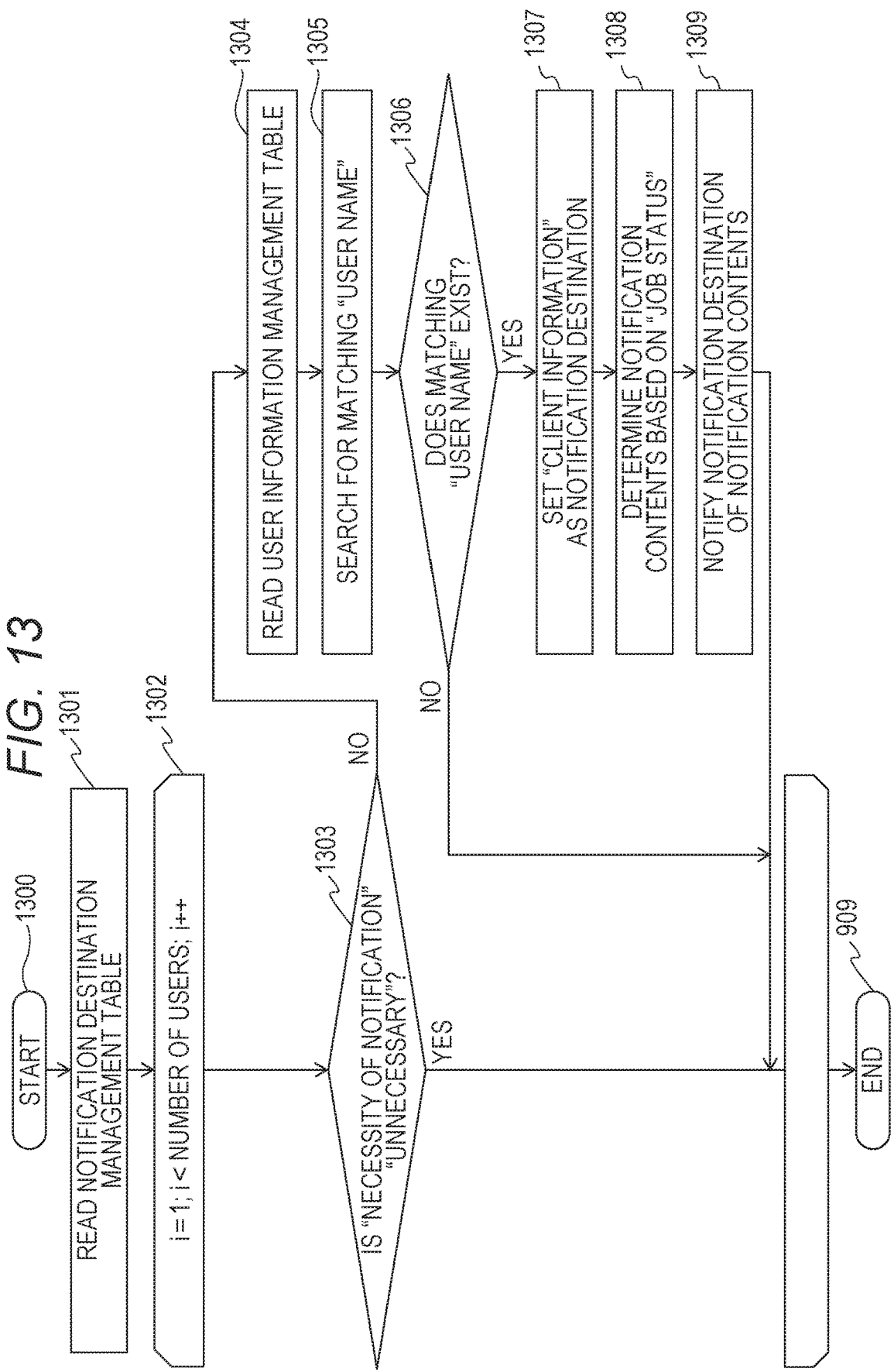
FIG. 13 is a flowchart illustrating details of notification processing according to the embodiment.

FIG. 13 is a flowchart illustrating details of the notification processing in step 505. The processing illustrated in FIG. 13 starts in response to the end of the necessity of notification determination processing (step 504) illustrated in FIG. 12. First, in step 1301, the notification unit 405 reads the notification destination management table, and performs notification processing for the number of records stored in the table, that is, the number of users determined to be notification targets (step 1302). In step 1303, the notification unit 405 extracts the item of necessity of notification 1101 and determines whether the necessity of notification is "UNNECESSARY". If the necessity of notification is "UNNECESSARY" ("YES" in step 1303), the notification unit 405 determines that notification is unnecessary and thus the processing returns to step 1302 to move on to the processing of the next user. On the other hand, if the necessity of notification is "NECESSARY" ("NO" in step 1303), notification is necessary and thus the processing proceeds to step 1304. In step 1304, the notification unit 405 reads a user information management table 700 via the notification destination control unit 404, and then performs processing for acquiring information necessary for notification. In step 1305, the notification unit 405 searches the user information management table 700 to determine whether a user name 701 that matches the user name read from the notification destination management table in step 1302 exists. If the user name 701 that matches the user name does not exist in the user information management table 700 ("NO" in step 1306), the processing returns to 1302 to move on to processing of the next user, and notification processing is not performed.

On the other hand, if the user name 701 that matches the user name exists in the user information management table 700 ("YES" in step 1306), the notification unit 405 extracts the client information 702 and sets it as the notification destination in step 1307. Next, in step 1308, the notification unit 405 generates contents to be notified based on the job status. For example, in the case where the way of notification is displaying on the screen of a user terminal, the contents for displaying different messages are generated in the case where the job status is "NORMAL" and the case where the job status is "SUSPENDED". Further, contents may be generated such that different messages are displayed in the case where the job status is "STANDBY" and the case where the job status is "SUSPENDED". For example, contents are generated such that a message "Error occurred in a job issued by Mr./Ms. (user name)." is displayed if the job status is "SUSPENDED", and a message "Error occurred in a job issued by another user." is displayed if the job status is "STANDBY". Next, in step 1309, the notification unit 405 notifies the destination set in step 1307 of the job status, and the processing ends.

More specifically, the processing is described with a part of the notification destination management table 1110 as an example. In step 1301, the notification unit 405 reads the notification destination management table 1110. The processing is performed for the records stored in the table having the job IDs 9101 to 9104, that is, the number of users determined to be notification targets. First, regarding the job identified by the job ID 9101, the necessity of the notification of the user name "3333" is "NECESSARY" ("NO" in step 1303), and thus the notification unit 405 reads the user information management table 700 in step 1304 since notification is necessary. Next, in step 1305, the notification unit 405 searches the read user information management table 700 for the user name 701 matching the user name "3333". As a result of the search, since the user name 701 that matches the user name "3333" exists ("YES" in step 1306), the notification unit 405 extracts the client information 702 having the user name "3333". As a result, in step 1307, the notification unit 405 sets the client information "ffgg-hhii-jjkk-8888" of the user name "3333" as the notification destination. Next, in step 1308, the notification unit 405 generates notification contents notifying that "the job has been normally completed" based on the job status "NORMAL" corresponding to the user name "3333". Finally, in step 1309, the notification unit 405 notifies the notification destination set in step 1307 of the notification contents generated in step 1308, and the processing ends. Note that the way of notification may be one of various ways and the client information 702 may include a way of notification. The notification unit 405 then notifies the destination specified by the notification destination information (e-mail address, IP address, etc.) indicated by the client information 702 by way of notification indicated by the client information 702. The processing illustrated in FIG. 13 is performed for each of the notification destination management tables 1100 and 1110.

According to the processing illustrated in FIG. 5, the information processing apparatus monitors printers, determines notification destinations depending on the job status or completion status, determines the necessity of notification based on incomplete job information, and performs notification. Particularly, when an error occurs in a print job in a printer, users who have not issued the print job are notified of the fact by the processing in steps 1005 to 1011 in FIG. 10. Therefore, the user can immediately know that printing of the user is incomplete because of an error occurring for some reason. In addition, by the processing in steps 1204 to 1208 in FIG. 12, notification of the print completion is not performed at a completion timing of each job, but only at a timing when all jobs issued by a specific user are completed. Therefore, it is possible to prevent a situation where a user goes to a printer to get printed sheets when some of jobs issued by the user is incomplete.

It should be noted that the above-described operation flow may be performed by one information processing apparatus, or a plurality of information processing apparatuses in conjunction with each other. Further, the information processing apparatus is configured to store the client information used as the notification destination in the user information management table 700, but a part or whole of the client information may be realized by a separate apparatus.

Second Embodiment

Hereinafter, one embodiment of the disclosure different from the first embodiment will be described in detail with reference to the drawings. Note that the same signs are given to the parts having similar functions to those in the first embodiment, and the same description is not repeated. The parts different from the first embodiment are the notification destination determination processing and the necessity of notification determination processing. In the first embodiment the notification destination determination processing and the necessity of notification determination processing are performed for each printer in a group of printers (106 to 108) that are management targets. On the other hand, in the second embodiment, the notification destination determination processing and the necessity of notification determination processing are performed for the group of printers (106 to 108) by cross search.

FIG. 14 is a diagram illustrating an example of a job queue management table generated by the job status monitoring processing in step 502 according to the second embodiment. The difference from the first embodiment is that the job queue management table 900 generated for the printer A 106 and the job queue management table 910 generated for the printer B 107 are managed on the same table.

Figure 15:
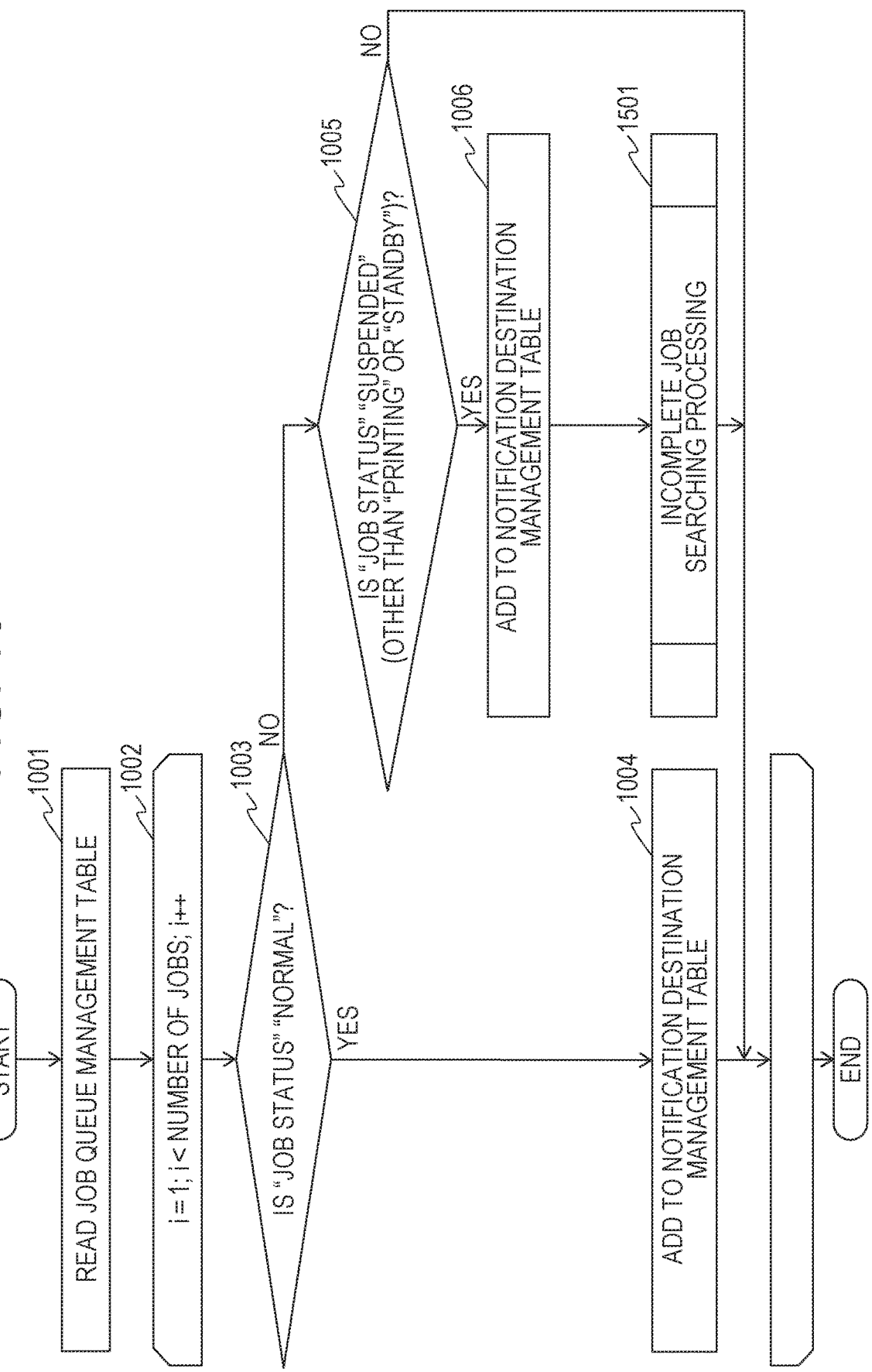
FIG. 15 is a flowchart illustrating details of notification destination determination processing according to the second embodiment.

FIG. 15 is a flowchart illustrating details of the notification destination determination processing in step 503 according to the second embodiment, which is performed instead of the processing illustrated in FIG. 10. Similarly to FIG. 10, a program corresponding to FIG. 15 is stored in the ROM 301, and the processing illustrated in FIG. 15 is realized by the CPU 300 executing the program. The difference from the first embodiment is incomplete job searching processing in step 1501 performed if the job status is other than "NORMAL" ("NO" in step 1003) and is "SUSPENDED" ("YES" in step 1005).

Figure 16:
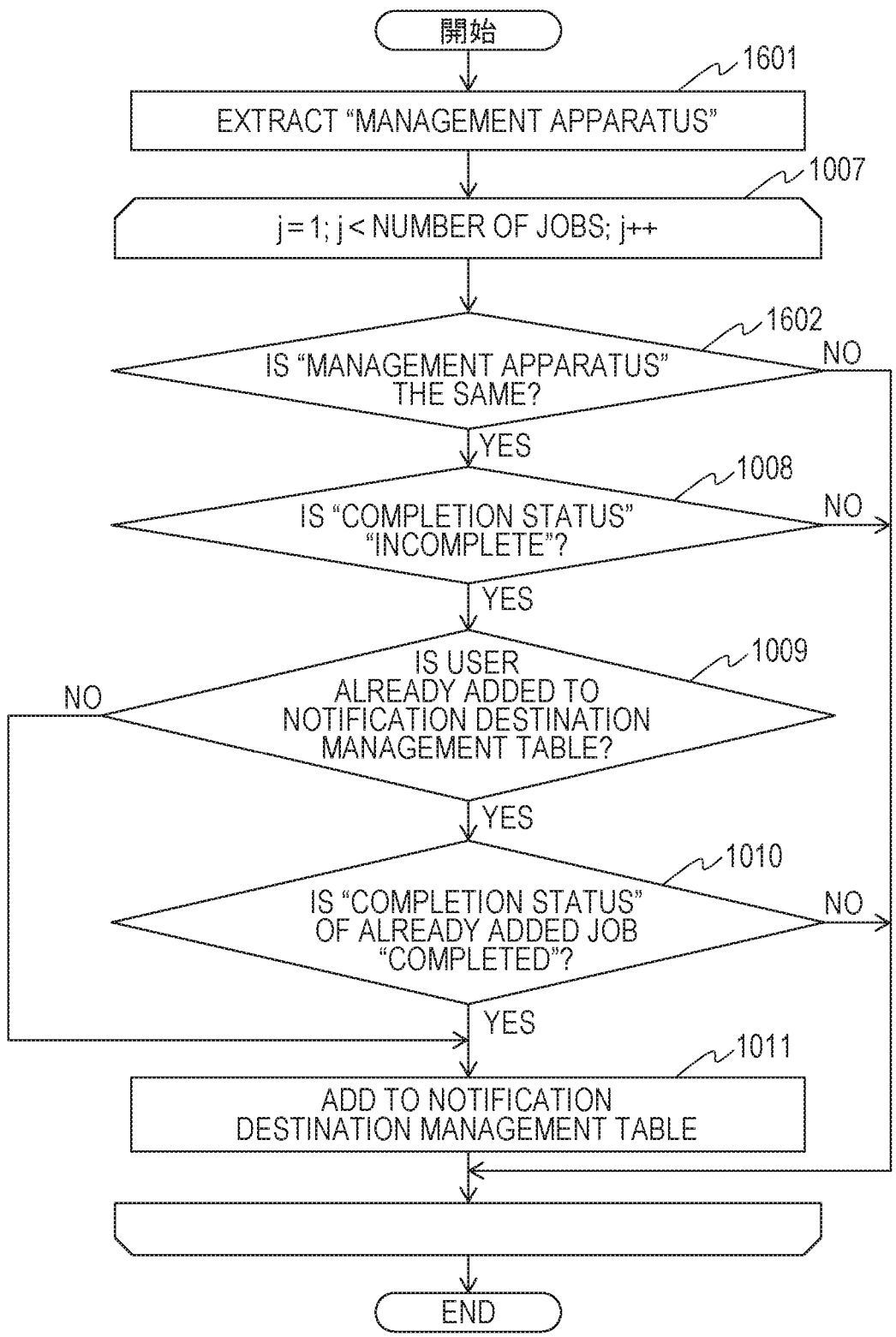
FIG. 16 is a flowchart illustrating details of incomplete job searching processing which is a part of notification destination determination processing according to the second embodiment.

FIG. 16 is a flowchart illustrating details of the incomplete job searching processing in step 1501 in the notification destination determination processing in step 503 according to the second embodiment. The difference from the first embodiment is that the incomplete job searching processing is performed based on determination whether the printer is the same as the printer having a job status "SUSPENDED". In step 1601, the notification unit 405 extracts an item of the management apparatus from the job information in a job queue management table 1400 that is a processing target in step 1002. Then, the notification unit 405 performs incomplete job searching processing for the number of records stored in the job queue management table 1400, that is, the number of jobs (step 1007). Here, the incomplete job searching processing is performed for the management apparatus extracted in step 1601. Thus, the notification unit 405 determines whether the job that is a processing target in step 1002 and the job that is a processing target in step 1007 correspond to the same management apparatus (step 1602).

If the management apparatuses are not the same ("NO" in step 1602), the processing returns to step 1007. If the management apparatuses are the same ("YES" in step 1602), the processing in the following steps is the same as that in FIG. 10.

FIG. 17 is a diagram illustrating an example of the notification destination management table generated based on the notification destination determination processing for the job queue management table 1400 according to the second embodiment. Since the job status of the job identified by the job ID 9010 is "NORMAL", the processing proceeds to step 1004 as a result of the processing in step 1003, and the job information of the job ID 9010 is added to a notification destination management table 1700. Since the job status of the job identified by the next job ID 9011 is other than "NORMAL" and is "SUSPENDED", it is determined as "NO" in step 1003 and "YES" in step 1005, and the processing proceeds to step 1006. In step 1006, the notification unit 405 adds the job information to the notification destination management table 1700 as a notification target. Next, in step 1601, the notification unit 405 extracts the item of the management apparatus of the job ID 9011. Since the management apparatus of the job ID 9011 is "PRINTER A", in steps following step 1007 in FIG. 16, the notification unit 405 performs the incomplete searching processing for the job information having "PRINTER A" as the management apparatus in the job queue management table 1400. In the job information identified by the job ID 9012, the management apparatus is "PRINTER A" and the job completion status is "INCOMPLETE". Thus, it is determined to be "YES" in step 1602 and "YES" in step 1008, and the processing proceeds to step 1009. Since the user name "2222" of the job information that is a processing target in step 1007 is already added as the job ID 9011 ("YES" in step 1009), and the completion status of the job identified by the job ID 9011 is not "COMPLETED" ("NO" in step 1010), the processing returns to step 1007. In the job information identified by the job ID 9013, the management apparatus is "PRINTER A" and the job completion status is "INCOMPLETE". Thus, it is determined to be "YES" in step 1602 and "YES" in step 1008, and the processing proceeds to step 1009. Since the user name "3333" of the job information that is a processing target in step 1007 is not added yet ("NO" in step 1009), the processing proceeds to step 1011 and the notification unit 405 adds the job information to the notification destination management table 1700.

Thereafter, the processing returns to step 1002 of FIG. 15, and the processing is repeated for jobs starting from the job identified by the job ID 9013. The job status of the job identified by each of the job IDs 9013, and 9110 to 9112 is "STANDBY" or "PRINTING". That is, the job status is other than "NORMAL" ("NO" in step 1003) and other than "SUSPENDED" ("NO" in step 1005). Thus, the job information corresponding to the job IDs is not added to the notification destination management table 1700 and the processing ends.

Figure 18:
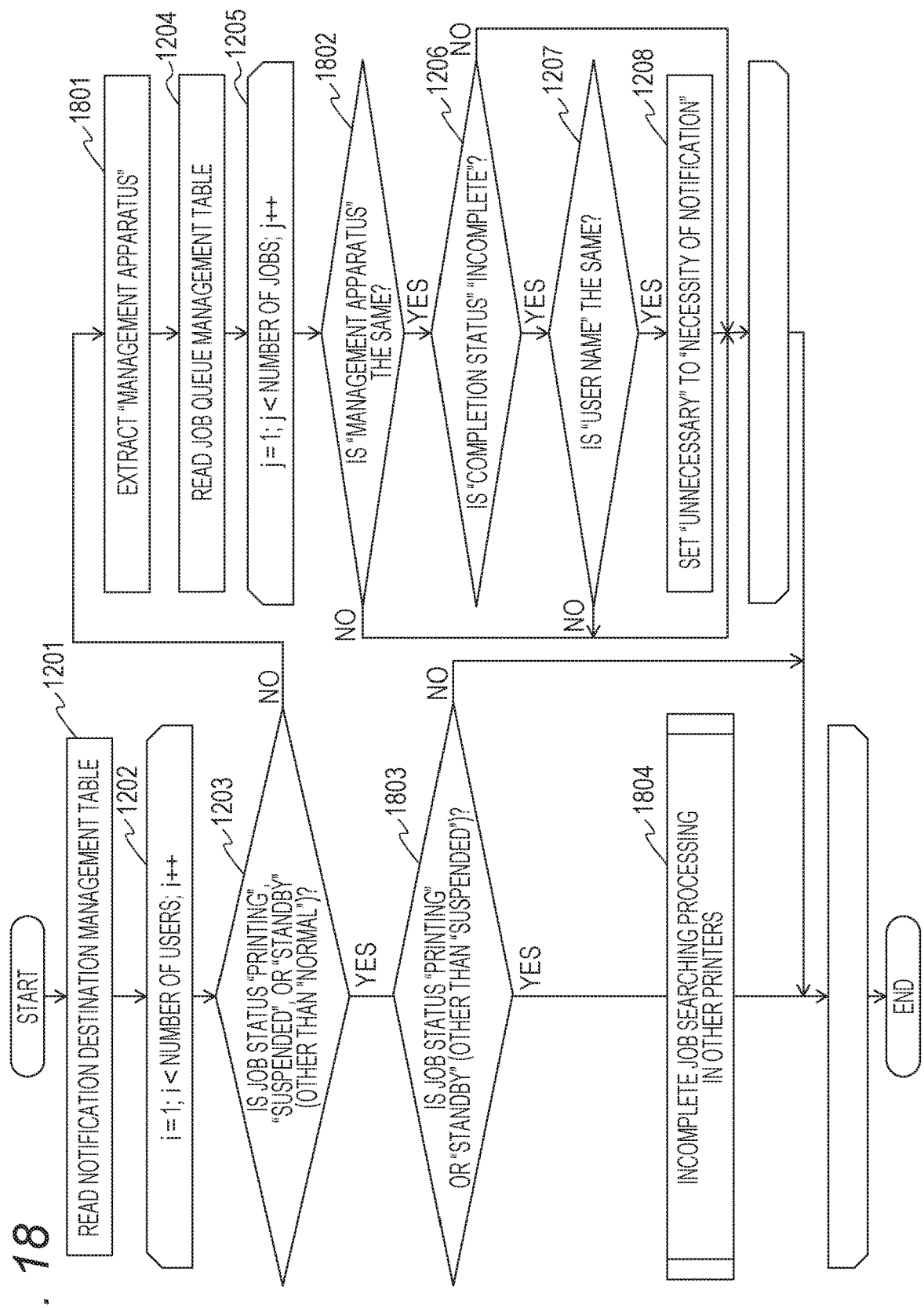
FIG. 18 is a flowchart illustrating details of necessity of notification determination processing according to the second embodiment.

FIG. 18 is a flowchart illustrating details of the necessity of notification determination processing in step 504 in the second embodiment, which is performed instead of the processing illustrated in FIG. 12. Similarly to FIG. 12, a program corresponding to FIG. 18 is stored in the ROM 301, and the processing illustrated in FIG. 15 is realized by the CPU 300 executing the program. A difference from the first embodiment is that the necessity of notification is determined depending on whether a job that has been issued by the same user to another printer exists even if the job status is "PRINTING" or "STANDBY". Another difference is that if the job status is "NORMAL" ("NO" in step 1203), it is checked, only within the same printer, whether a job that has been issued by the same user and that is incomplete exists.

If the job status is "NORMAL" ("NO" in step 1203), in 1801, the notification unit 405 extracts the item of the management apparatus from the job information that is the processing target in step 1202. Next, the notification unit 405 performs the incomplete job searching processing for the number of records stored in the job queue management table, that is, the number of jobs (step 1205). Here, the incomplete job searching processing is performed for the management apparatus extracted in step 1801. Specifically, the notification unit 405 determines whether the management apparatus of the job information that is the processing target in step 1205 is the same as the management apparatus of the job information that is the processing target in step 1202 (step 1802). If the management apparatuses are not the same ("NO" in step 1802), the processing returns to step 1205. If the management apparatuses are the same ("YES" in step 1802), the processing in the following steps is the same as that in FIG. 12.

On the other hand, if the job status is other than "NORMAL" ("YES" in step 1203), it is further checked whether the job status is other than "SUSPENDED", that is, whether the job status itself is "SUSPENDED" (step 1803). If the job status is "SUSPENDED" ("NO" in step 1803), the processing returns to step 1202. If the job status is other than "SUSPENDED" ("YES" in step 1803), processing proceeds to the incomplete job searching processing in another printer in step 1804.

Figure 19:
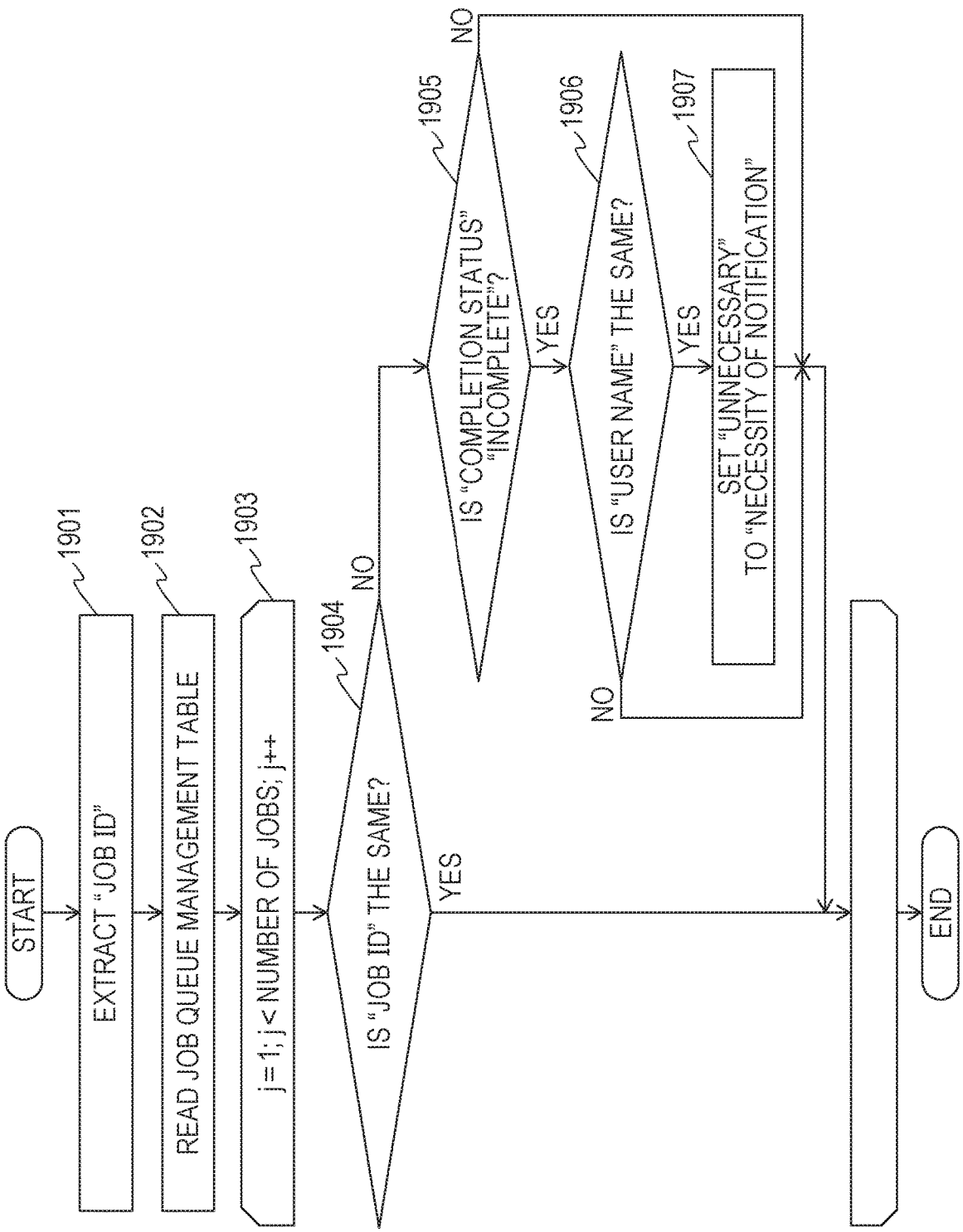
FIG. 19 is a flowchart illustrating details of incomplete job searching processing in another printer which is a part of the necessity of notification determination processing according to the second embodiment.

FIG. 19 is a flowchart illustrating details of the incomplete job searching processing in another printer in step 1804, which is performed in the necessity of notification determination processing in step 504 according to the second embodiment. In step 1901, the notification unit 405 extracts the item of the job ID of the job information that is the processing target in step 1202 of FIG. 18. Next, in step 1902, the notification unit 405 reads the job queue management table, and performs the incomplete job searching processing for the number of records stored in the job queue management table, that is, the number of jobs (step 1903). Here, in order to exclude the job identified by the job ID that is the same as the job ID read from the notification destination management table and extracted in step 1901, the notification unit 405 determines whether the job ID of a job that is the processing target in step 1903 is the same as the job ID extracted in step 1901 (step 1904). If the job ID is the same ("YES" in step 1904), the processing returns to step 1903. If the job ID is not the same, ("NO" in step 1904), the notification unit 405 checks whether the completion status of the job that is the processing target in step 1903 is "INCOMPLETE" (step 1905). If the completion status of the job is "INCOMPLETE" ("YES" in step 1905), the processing proceeds to step 1906. In step 1906, the notification unit 405 checks whether the user name of the job information that is the processing target in step 1903 and the user name of the job information that is the processing target in step 1202 of FIG. 18 are the same. If the user names are the same ("YES" in step 1906), the processing proceeds to step 1907 since notification is unnecessary. In step 1907, the notification unit 405 overwrites the item of necessity of notification 1101 of the user that is the processing target in step 1202 of FIG. 18 with "UNNECESSARY" in the notification destination management table. On the other hand, if the job status is other than "INCOMPLETE" ("NO" in step 1905), or if the user names are not the same ("NO" in step 1906), the processing proceeds to the next step with the item of necessity of notification 1101 kept "NECESSARY".

More specifically, the processing is described with the notification destination management table 1700 as an example. In step 1201, the notification unit 405 reads the notification destination management table 1700. The number of records stored in the table is three corresponding to job information that is identified by the job IDs 9010, 9011, and 9013. In step 1202, processing is performed for each of the three pieces of job information. First, the notification unit 405 checks the job status of the job identified by the job ID 9010. Since the job status is "NORMAL" ("NO" in step 1203), "PRINTER A" which is the management apparatus is extracted in step 1801. Next, the job queue management table 1400 is read in step 1204, and the processing is repeated for the number of records stored in the table, that is, the number of jobs in step 1205. Here, in order to exclude management apparatuses other than the management apparatus read from the notification destination management table 1700 and extracted in step 1801, the notification unit 405 determines whether the management apparatuses are the same (step 1802). In the job information identified by the job ID 9010, the management apparatus is "PRINTER A" ("YES" in step 1802). Thus, the processing proceeds to step 1206. However, the processing proceeds to the next step since the completion status is not "INCOMPLETE" ("NO" in step 1206). The determination processing in step 1206 is repeated for jobs having "PRINTER A" as the management apparatus in corresponding job information. In the job queue management table 1400, job information having "PRINTER A" as the management apparatus exists but job information having the same user name "1111" does not exist. Thus, the processing ends with the item necessity of notification 1101 of the user kept "NECESSARY".

Next, the notification unit 405 checks the job status of the job identified by the job ID 9011. Since the job status is other than "NORMAL" ("YES" in step 1203), the processing proceeds to step 1803, and since the job status is "SUSPENDED" ("NO" in step 1803), the processing proceeds directly to the next step. That is, the value of the necessity of notification is kept "NECESSARY".

Next, the notification unit 405 checks the job status of the job identified by the job ID 9013. Since the job status is "STANDBY" ("YES" in step 1203), the processing proceeds to step 1803, and since the job status is other than "SUSPENDED" ("YES" in step 1803), the processing proceeds to the incomplete job searching processing in another printer in step 1804. First, the job ID "9013" is extracted from the notification destination management table 1700 read in step 1901. Next, in step 1902, the notification unit 405 reads the job queue management table 1400, and performs the incomplete job searching processing for the number of records stored in a job queue management table 1400, that is, the number of jobs (step 1903). Here, in order to exclude the job identified by the job ID that is the same as the job ID read from the notification destination management table 1700 and extracted in step 1901, the notification unit 405 determines whether the job IDs are the same (step 1904). That is, if the job ID is other than "9013" ("NO" in step 1904), the processing proceeds to steps 1905 and 1906, and it is checked whether the completion status of the job is "INCOMPLETE" or a job having the same user name exists. In the job queue management table 1400, job information in which the job completion status is "INCOMPLETE" ("YES" in step 1905) and the user name is the same as the user name "3333" of the job identified by the job ID 9013 ("YES" in step 1906) is a job information identified by the job ID 9112. Therefore, it is determined that the notification is unnecessary for the job ID 9013, and in step 1907 the item of necessity of notification 1101 in the notification destination management table 1700 is overwritten with "UNNECESSARY" and the processing ends.

Next, the notification processing in step 505 is performed on the notification destination management table updated by the necessity of notification determination processing in FIGS. 18 and 19. The processing is similar to the processing of FIG. 13 also in the second embodiment.

That is, for the printer A, an error has occurred in the job identified by the job ID 9011, and the job identified by the job ID 9013 and issued by the user "3333" is on standby. However, the user having the user name "3333" has issued a job identified by the job ID 9112 that is on standby in the printer B. Then, the user having the user name "3333" is not notified. On the other hand, the job identified by the job ID 9011 is a job in which an error has occurred, and thus the user having the user name "2222" who has issued the job is notified.

In this way, a plurality of printers are monitored by cross search to determine necessity of notification and even a user who may be affected by an error is not notified if an incomplete job issued by the user exists in another printer. This makes it possible to send notifications appropriately only to users who has high necessity to deal with the error.

Note that it is not necessary to determine whether the management apparatuses are the same. That is, processing of steps 1801 and 1802 is not necessary. In this case, in a case where a certain user issues jobs to a plurality of printers, a print completion notification is issued after all jobs issued by the user are completed in the plurality of printers. For example, taking the job queue management table illustrated in FIG. 14 as an example, even if the print job identified by the job ID 9010 that has been issued to the printer A by the user having the user name "1111" is completed, a print completion notification is not issued. Then, after the print jobs identified by the job IDs 9010 to 9112 issued to the printer B are completed, a print completion notification is issued. That is, it is possible to prompt a user to go to a plurality of printers to pick up printed materials after all print jobs issued to the plurality of printers by the user are completed.

Third Embodiment

Hereinafter, one embodiment of the disclosure different from the first embodiment and the second embodiment will be described in detail with reference to the drawings. Note that the same signs are given to the parts having similar functions to those in the first embodiment and the second embodiment, and the same description is not repeated. The difference from the first embodiment and the second embodiment is the notification destination determination processing and the necessity of notification determination processing. The notification destination determination processing and the necessity of notification determination processing are performed for each printer in a group of printers (106 to 108) that are management targets in the first embodiment and are performed for the group of printers by cross search in the second embodiment. On the other hand, in the third embodiment, the notification destination determination processing and the necessity of notification determination processing are performed for a group of printers (106 to 108) with grouping the printers.

FIG. 20 is a diagram illustrating an example of a printer group management table according to the third embodiment.

The column of management apparatus 2001 corresponds to a group of printers (106 to 108) managed by the image output apparatus DB 400. The installation location 2002 is information indicating a place where each of the printers (106 to 108) is installed. This information is registered in the printer in advance. However, configuration allowing registration of the information on the system when printer information is recorded in the image output apparatus DB 400 is possible. The group 2003 is information for grouping the printers as the management apparatuses 2001 based on the column of installation location 2002. More specifically, the group 2003 indicates that the printer A 106 and the printer C 108 belong to the same group "0001" because their installation locations are the same "◯◯". On the other hand, the group 2003 indicates that the printer B 107 belongs to the group "0002" at the installation location "ΔΔΔ".

The above grouping is performed by the image output apparatus management unit 401. The image output apparatus management unit 401 puts a plurality of printers at the same installation location 2002 in the same group, for example. However, the way of grouping is not limited to this, and a group specified by a user for each printer on a display screen provided by the image output apparatus management unit 401 may be set.

FIG. 21 is a diagram illustrating an example of a job queue management table generated by the job status monitoring processing in step 502 according to the third embodiment. The difference from the first embodiment is that the group of printers (106 to 108) to be a management target are managed on the same table similar to the second embodiment.

FIG. 22 is a diagram illustrating an example of the notification destination management table generated based on the notification destination determination processing in step 503 according to the third embodiment. More specifically, FIG. 22 illustrates the notification destination management table generated based on the notification destination determination processing in step 503 for a job queue management table 2100 of FIG. 21. The notification destination determination processing in step 503 in the third embodiment is similar to the processing of FIGS. 15 and 16.

Since the job status of the job identified by the job ID 9020 is determined to be "NORMAL" in step 1003, the processing proceeds to step 1004 and the job is added to a notification destination management table 2200. Since the job status of the job identified by the next job ID 9021 is other than "NORMAL" ("NO" in step 1003) and is "SUSPENDED" ("YES" in step 1005), the processing proceeds to step 1006 and the job information is added to the notification destination management table 2200 as a notification target. Next, in step 1601, the item of the management apparatus of the job information is extracted. Since the management apparatus of the job ID 9021 is "PRINTER A", the notification unit 405 performs the incomplete searching processing for the job information having "PRINTER A" as the management apparatus in the job queue management table 2100. In the job information identified by the job ID 9020, the management apparatus is "PRINTER A" ("YES" in step 1602), but the job completion status is "COMPLETED" ("NO" in step 1008). Thus, the processing proceeds to a next step directly. In the job information of the job identified by the job ID 9021, the management apparatus is "PRINTER A" ("YES" in step 1602) and the job completion status is "INCOMPLETE" ("YES" in step 1008). Thus, the processing proceeds to step 1009. Since the job information is already added as the job identified by the job ID 9021 itself ("YES" in step 1009), and the completion status of the job information is not "COMPLETED" ("NO" in step 1010), the processing proceeds directly to the next step. In the job information of the job identified by the job ID 9022, the management apparatus is "PRINTER A" ("YES" in step 1602) and the job completion status is "INCOMPLETE" ("YES" in step 1008). Thus, the processing proceeds to step 1009. Since the user name "2222" of the job information is already added as the job identified by the job ID 9021 ("YES" in step 1009), and the completion status of the job information is not "COMPLETED" ("NO" in step 1010), the processing proceeds directly to the next step. In the job information of the job identified by the job ID 9023, the management apparatus is "PRINTER A" ("YES" in step 1602) and the job completion status is "INCOMPLETE" ("YES" in step 1008). Thus, the processing proceeds to step 1009. Since the user name "3333" of the job information is not added yet ("NO" in step 1009), the job information is added to the notification destination management table 2200 in step 1011. In the job information identified by the job IDs 9120 to 9022, the management apparatus is not "PRINTER A" ("NO" in step 1602). Thus, the job information is not added to the notification destination management table 2200 and the processing proceeds to the next step. Thereafter, the processing returns to step 1002, and the processing is repeated for jobs starting from the job identified by the job ID 9022. The job statuses of the jobs identified by the job IDs 9022 to 9023 issued to the printer A and the jobs identified by the job IDs 9120 to 9122 issued to the printer B are "STANDBY" and "PRINTING". Also, the job status of the job identified by the job ID 9201 issued to the printer C is "PRINTING". Therefore, for those jobs, it is determined that the job status is other than "NORMAL" ("NO" in step 1003) and other than "SUSPENDED" ("NO" in step 1005). Thus, the job information is not added to the notification destination management table 2200 and the processing ends.

Figure 23:
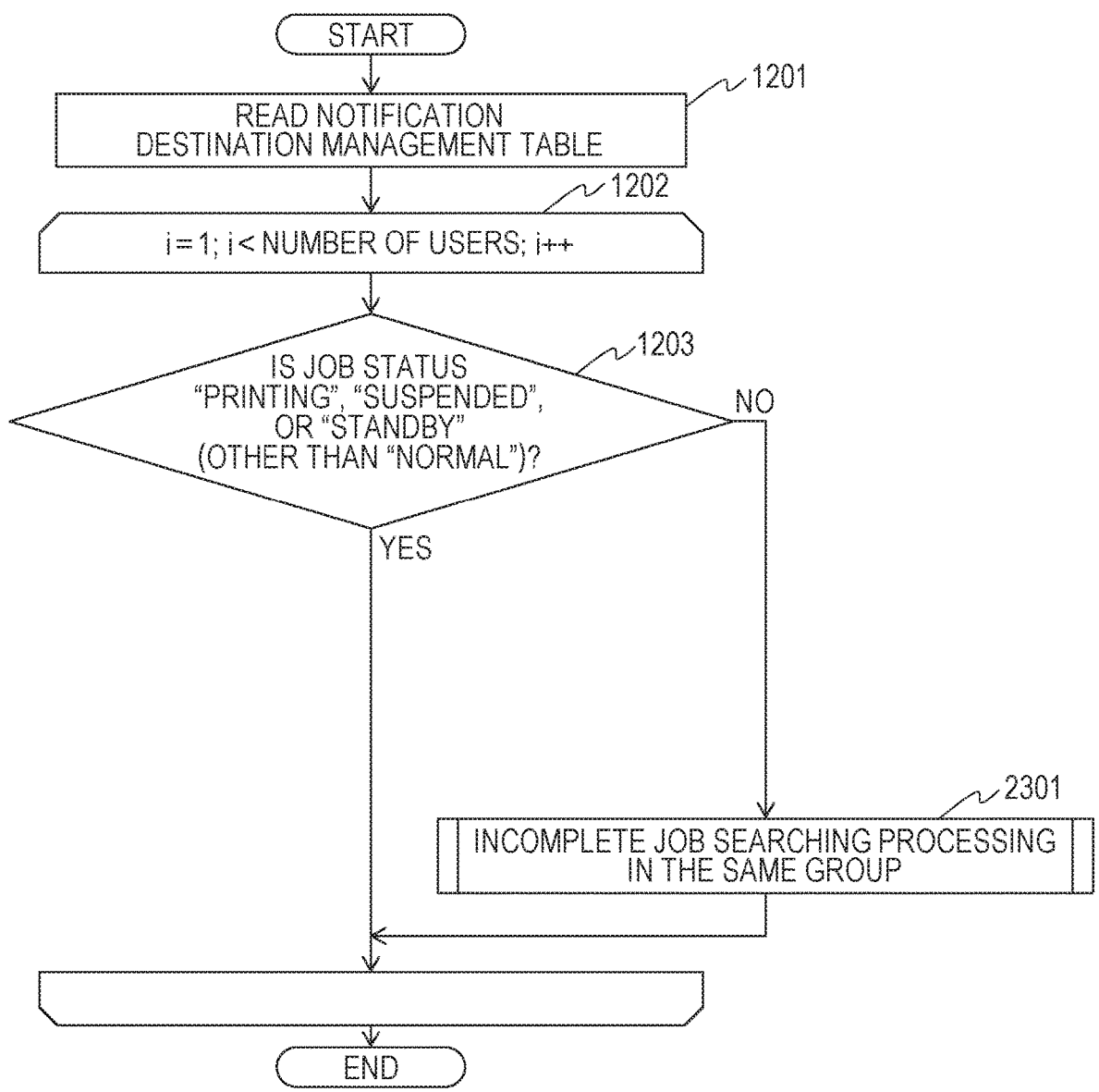
FIG. 23 is a flowchart illustrating details of necessity of notification determination processing according to the third embodiment.

FIG. 23 is a flowchart illustrating details of the necessity of notification determination processing in step 504 in the third embodiment, which is performed instead of the processing illustrated in FIG. 12. A program corresponding to FIG. 23 is stored in the ROM 301, and the processing illustrated in FIG. 15 is realized by the CPU 300 executing the program. The difference from the first embodiment is that if the job status is "NORMAL" ("NO" in step 1203), it is checked, within a predetermined group to which the printer belongs, whether a job that has been issued by the same user and that is incomplete exists in step 2301. The difference from the second embodiment is that, the necessity of notification is not determined if the job status is other than "NORMAL" ("YES" in step 1203) in addition to the difference from the first embodiment. On the other hand, if the job status is one of "PRINTING", "SUSPENDED", and "STANDBY", that is, the job status is other than "NORMAL" ("YES" in step 1203), the processing proceeds directly to the next step. On the other hand, if the job status is "NORMAL" ("NO" in step 1203), the processing proceeds to the incomplete job searching processing in the same group in step 2301.

Figure 24:
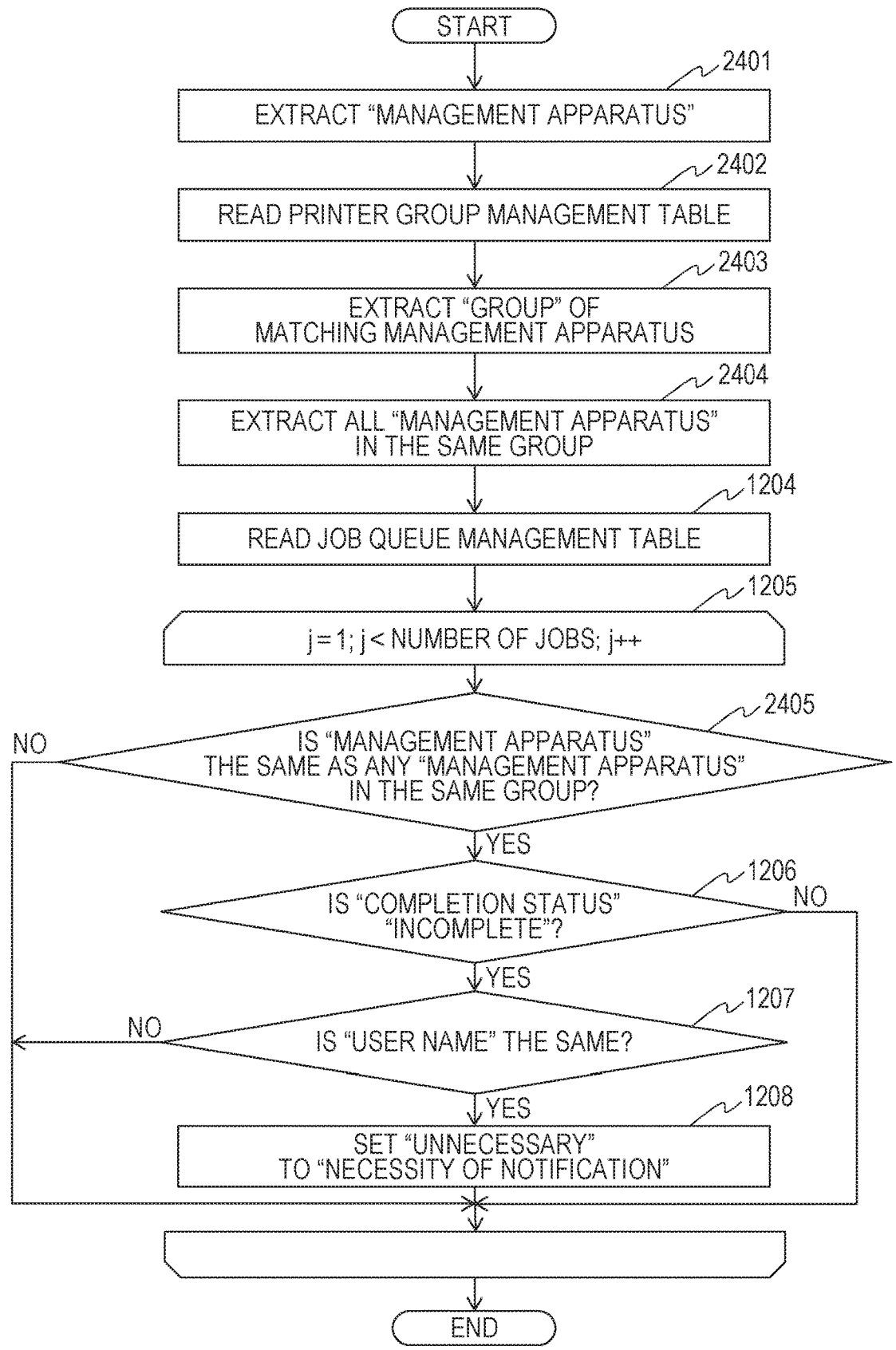
FIG. 24 is a flowchart illustrating details of incomplete job searching processing in searching processing in the same group according to the third embodiment.

FIG. 24 is a flowchart illustrating details of the incomplete job searching processing in the same group in step 2301 in the necessity of notification determination processing in step 504 according to the third embodiment. In step 2401, the notification unit 405 extracts the item of the management apparatus of the job. In step 2402, the notification unit 405 reads the printer group management table and searches the printer group management table for the management apparatus of the job extracted in step 2401. In step 2403, the notification unit 405 identifies a management apparatus matching the management apparatus extracted in step 2401 as a result of the search in step 2402, and extracts the group information corresponding to the identified management apparatus. Next, in step 2404, the notification unit 405 extracts the management apparatus having the same group information as the group information extracted in step 2403 from the printer group management table. Thereafter, the notification unit 405 performs the incomplete job searching processing for the number of records stored in the job queue management table, that is, the number of jobs (step 1205).

Here, in order to perform the incomplete job searching processing for the group of management apparatuses that belong to the same group and extracted in step 2404, the notification unit 405 determines whether the management apparatus is the same as any one of the management apparatuses in the same group (step 2405). If the management apparatus does not match any of the management apparatuses in the group ("NO" in step 2405), the processing proceeds directly to the next step. If the management apparatus is the same as one of the management apparatuses in the group ("YES" in step 2405), the processing in the following steps is the same as that in FIG. 12.

More specifically, the processing is described with the notification destination management table 2200 as an example. In step 1201, the notification unit 405 reads the notification destination management table 2200. The number of records stored in the table is three corresponding to pieces of job information that are identified by the job IDs 9020, 9021, and 9023. In step 1202, processing is performed for each of the three pieces of job information. First, the notification unit 405 checks the job status of the job identified by the job ID 9020. Since the job status is "NORMAL" ("NO" in step 1203), the processing proceeds to the incomplete job searching processing in the same group in step 2301. In step 2401, "PRINTER A" that is the management apparatus of the job identified by the job ID 9020 is extracted. Next in step 2402, a printer group management table 2000 is read, and the printer group management table 2000 is searched for the management apparatus "PRINTER A". Here, the group "0001" of the management apparatus "PRINTER A" on the printer group management table 2000 is extracted (step 2403), and management apparatuses belonging to the same group "0001" are extracted in step 2404. From the printer group management table 2000, in addition to the management apparatus "PRINTER A", the management apparatus "PRINTER C" is extracted as a management apparatus belonging to the same group. Next, the job queue management table 2100 is read, and the processing is repeated for the number of records stored in the table, that is, the number of jobs. Here, in order to exclude management apparatuses other the management apparatuses belonging to the group "0001" extracted in step 2404, the notification unit 405 determines whether the management apparatus is the same as either one of the management apparatuses "PRINTER A" and "PRINTER C" in the same group (step 2405). In the job queue management table 2100, the jobs identified by the job IDs 9020 to 9023 and issued to the printer A and the jobs identified by the job ID 9201 and issued to the printer C satisfy the conditions ("YES" in step 2405). Next, it is checked whether the job completion status of the job is "INCOMPLETE" ("YES" in step 1206) and the user name is "1111" which is the same as that of the job identified by the job ID 9020 ("YES" in step 1207). Since the job identified by the job ID 9201 satisfies the conditions, it is determined that notification is unnecessary for the job ID 9201. Therefore, in step 1208, the item of necessity of notification 1101 for the user in the notification destination management table 2200 is overwritten with "UNNECESSARY". Thereafter, the processing returns to step 1202, and the processing is repeated for jobs starting from the job identified by the job ID 9021. Since the job statuses of the jobs identified by the job IDs 9021 and 9023 are "SUSPENDED" and "STANDBY" respectively, and thus other than "NORMAL" ("NO" in step 1203), the items of necessity of notification 1101 of the jobs are not overwritten and the processing ends with the items kept "NECESSARY".

Next, the notification processing in step 505 is performed on the notification destination management table updated by the necessity of notification determination processing in FIGS. 23 and 24. The processing is similar to the processing of FIG. 13 also in the third embodiment.

By thus grouping and monitoring the printers, and determining necessity of notification for groups of the printers resulting from the grouping, it is possible to more effectively send completion notifications of jobs. Specifically, even when a job issued by a certain user is completed by a certain printer, if a job issued by the user has not been completed in another printer installed close to the printer, the use is not notified. That is, it is possible to prevent a situation where a notification of print completion is issued to a user when printing in some of a plurality of printers installed close to each other is completed even if printing in others of the printers is not completed. Therefore, the user can go to the plurality of printers close to each other to pick up the printed materials according to the notification after the printing is completed in the plurality of printers.

In the above-described operation flow, the installation location information is used as information for grouping, but other information can be used as long as it is attribute information that can classify printers such as model information.

The above-described embodiments have been described using a print job as an example of a job type, and a printer as an example of an execution apparatus that executes a job. However, the processing in the above-described embodiments can be applied to jobs for causing an apparatus to perform various types of processing such as a document reading and scanning job.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-025493, filed Feb. 15, 2018, which is hereby incorporated by reference herein in its entirety.

What is claimed is:

1. An apparatus comprising:
an acquisition unit configured to acquire status information on a status of a job executed by one of a plurality of execution apparatuses and notification destination information on a notification destination corresponding to the job; and
a notification unit configured to make a notification to the notification destination corresponding to the job based on the acquired notification destination information in a case where the acquisition unit acquires completion information corresponding to completion of the job as the status information and in a case where the acquisition unit acquires error information corresponding to an error of the job as the status information, wherein
the notification unit,
in a case where a first job corresponding to a first notification destination and a second job corresponding to a second notification destination are issued to a predetermined execution apparatus out of the plurality of execution apparatuses, the first job is completed, and the second job is incomplete, notifies the first notification destination based on the notification destination information corresponding to the first job, and
in a case where the first job and the second job are issued to the predetermined execution apparatus, an error occurs in the first job, and the second job is incomplete, notifies the first notification destination and the second notification destination based on notification destination information corresponding to the first job and the notification destination information corresponding to the second job.

2. The apparatus according to claim 1, wherein
the notification unit,
does not make a notification in a case where the first job and a third job corresponding to the first notification destination are issued to the predetermined execution apparatus, the first job is completed, and the third job is incomplete, and
notifies the first notification destination in a case where no incomplete job corresponding to the first notification destination and issued to the predetermined execution apparatus exists after completion of the third job.

3. The apparatus according to claim 2, wherein
the notification unit notifies the first notification destination regardless of whether an incomplete job corresponding to the first notification destination and issued to an execution apparatus other than the predetermined execution apparatus out of the plurality of execution apparatuses exists in a case where no incomplete job corresponding to the first notification destination and issued to the predetermined execution apparatus exists after completion of the first job and the third job.

4. The apparatus according to claim 2, wherein
the notification unit does not notify the first notification destination in a case where an incomplete job corresponding to the first notification destination and issued to an execution apparatus other than the predetermined execution apparatus out of the plurality of execution apparatuses exists even in a case where no incomplete job corresponding to the first notification destination and issued to the predetermined execution apparatus exists after completion of the first job and the third job.

5. The apparatus according to claim 4 further comprising:
a setting unit configured to set a group including a part of the plurality of execution apparatuses, wherein
the setting unit sets a group that includes the predetermined execution apparatus and the first execution apparatus, and
in a case where no incomplete job corresponding to the first notification destination and issued to the predetermined execution apparatus exists after completion of the first job and the third job, the notification unit notifies the first notification destination in a case where the incomplete job is issued to the second execution apparatus.

6. The apparatus according to claim 1 further comprising
a registration unit configured to register the notification destination information corresponding to user identification information, wherein
the acquisition unit acquires the notification destination information that corresponds to the user identification information included in the job and that is registered by the registration unit.

7. The apparatus according to claim 6, wherein
the acquisition unit acquires the user identification information included in the job from the predetermined execution apparatus.

8. The apparatus according to claim 1, wherein
the acquisition unit acquires first status information of the first job and second status information of the second job from the predetermined execution apparatus, and
the notification unit,
notifies the first notification destination in a case where the first status information is the completion information and the second status information is incompletion information corresponding to an incomplete status, and
notifies the first notification destination and the second notification destination in a case where the first status information is the error information and the second status information is the incompletion information.

9. The apparatus according to claim 8, wherein
each of the plurality of execution apparatuses includes a job queue for storing the status information of a job issued to the execution apparatus itself, and
the acquisition unit acquires the first status information and the second status information from the job queue included in the predetermined execution apparatus.

10. The apparatus according to claim 1, wherein
each of the plurality of execution apparatuses is a printer that prints an image, and the job is a print job.

11. The apparatus according to claim 1, wherein
the notification unit makes a notification based on the completion information and a notification based on the error information, the notifications having different contents from each other.

12. The apparatus according to claim 1, wherein
in a case where the first job and the second job are issued to the predetermined execution apparatus, an error occurs in the first job, and the second job is incomplete, the notification unit notifies the first notification destination and the second notification destination of different contents from each other.

13. A method performed by an apparatus, the method comprising:
    acquiring status information on a status of a job executed by one of a plurality of execution apparatuses and notification destination information on a notification destination corresponding to the job; and
    making a notification to the notification destination corresponding to the job based on the acquired notification destination information in a case where completion information corresponding to completion of the job is acquired as the status information in the acquiring and in a case where error information corresponding to an error of the job is acquired as the status information, wherein
    in the making a notification,
    in a case where a first job corresponding to a first notification destination and a second job corresponding to a second notification destination are issued to a predetermined execution apparatus out of the plurality of execution apparatuses, the first job is completed, and the second job is incomplete, the first notification destination is notified based on the notification destination information corresponding to the first job, and
    in a case where the first job and the second job are issued to the predetermined execution apparatus, an error occurs in the first job, and the second job is incomplete, the first notification destination and the second notification destination are notified based on notification destination information corresponding to the first job and the notification destination information corresponding to the second job.

14. The method according to claim 13, wherein
    not making a notification in a case where the first job and a third job corresponding to the first notification destination are issued to the predetermined execution apparatus, the first job is completed, and the third job is incomplete, and
    notifying the first notification destination in a case where no incomplete job corresponding to the first notification destination and issued to the predetermined execution apparatus exists after completion of the third job.

15. The method according to claim 13, further comprising:
    registering the notification destination information corresponding to user identification information, wherein
    the acquiring acquires the notification destination information that corresponds to the user identification information included in the job and that is registered by the registering.

16. The method according to claim 13, wherein
    the acquiring acquires first status information of the first job and second status information of the second job from the predetermined execution apparatus, and
    the notifying,
    notifies the first notification destination in a case where the first status information is the completion information and the second status information is incompletion information corresponding to an incomplete status, and
    notifies the first notification destination and the second notification destination in a case where the first status information is the error information and the second status information is the incompletion information.

17. A storage medium storing a program executed by an apparatus, the program causing the apparatus to perform:
    acquiring status information on a status of a job executed by one of a plurality of execution apparatuses and notification destination information on a notification destination corresponding to the job; and
    making a notification to the notification destination corresponding to the job based on the acquired notification destination information in a case where completion information corresponding to completion of the job is acquired as the status information in the acquiring and in a case where error information corresponding to an error of the job is acquired as the status information, wherein
    in the making a notification,
    in a case where a first job corresponding to a first notification destination and a second job corresponding to a second notification destination are issued to a predetermined execution apparatus out of the plurality of execution apparatuses, the first job is completed, and the second job is incomplete, the first notification destination is notified based on the notification destination information corresponding to the first job, and
    in a case where the first job and the second job are issued to the predetermined execution apparatus, an error occurs in the first job, and the second job is incomplete, the first notification destination and the second notification destination are notified based on notification destination information corresponding to the first job and the notification destination information corresponding to the second job.

18. The storage medium according to claim 17, wherein
    not making a notification in a case where the first job and a third job corresponding to the first notification destination are issued to the predetermined execution apparatus, the first job is completed, and the third job is incomplete, and
    notifying the first notification destination in a case where no incomplete job corresponding to the first notification destination and issued to the predetermined execution apparatus exists after completion of the third job.

19. The storage medium according to claim 17 further comprising:
    registering the notification destination information corresponding to user identification information, wherein
    the acquiring acquires the notification destination information that corresponds to the user identification information included in the job and that is registered by the registering.

20. The storage medium according to claim 17, wherein
    the acquiring acquires first status information of the first job and second status information of the second job from the predetermined execution apparatus, and
    the notifying,
    notifies the first notification destination in a case where the first status information is the completion information and the second status information is incompletion information corresponding to an incomplete status, and
    notifies the first notification destination and the second notification destination in a case where the first status information is the error information and the second status information is the incompletion information.

* * * * *